(12) United States Patent
Watanabe et al.

(10) Patent No.: US 11,469,689 B2
(45) Date of Patent: Oct. 11, 2022

(54) VIBRATION WAVE MOTOR, DRIVE CONTROL SYSTEM, AND OPTICAL APPARATUS

(71) Applicant: CANON KABUSHIKI KAISHA, Tokyo (JP)

(72) Inventors: Tomohiro Watanabe, Yokohama (JP); Akira Uebayashi, Tokyo (JP); Tatsuo Furuta, Machida (JP); Shinya Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 16/429,859

(22) Filed: Jun. 3, 2019

(65) Prior Publication Data
US 2019/0379305 A1    Dec. 12, 2019

(30) Foreign Application Priority Data
Jun. 8, 2018    (JP) .............................. JP2018-110576

(51) Int. Cl.
*H02N 2/16* (2006.01)
*H02N 2/14* (2006.01)
*G02B 7/02* (2021.01)
*G02B 7/04* (2021.01)
*H02N 2/00* (2006.01)

(52) U.S. Cl.
CPC ............... *H02N 2/16* (2013.01); *G02B 7/026* (2013.01); *G02B 7/04* (2013.01); *H02N 2/147* (2013.01); *H02N 2/22* (2013.01)

(58) Field of Classification Search
CPC ............ H02N 2/16; H02N 2/147; H02N 2/22; H02N 2/0065; H02N 2/163; G02B 7/026; G02B 7/04; G02B 7/08; G03B 3/10; G03B 2205/0061
See application file for complete search history.

(56) References Cited

U.S. PATENT DOCUMENTS

| 5,134,333 A | 7/1992 | Atsuta |
| 10,038,394 B2 | 7/2018 | Ifuku et al. |
| 2016/0118914 A1* | 4/2016 | Ifuku ................... H01L 41/257 29/25.35 |
| 2017/0153410 A1 | 6/2017 | Hayashi et al. |

(Continued)

FOREIGN PATENT DOCUMENTS

| JP | 63-240382 A | 10/1988 |
| JP | 03-230771 A | 10/1991 |

*Primary Examiner* — Emily P Pham
(74) *Attorney, Agent, or Firm* — Venable LLP

(57) ABSTRACT

A vibration wave motor includes an annular oscillator, and an annular moving member provided so as to be in press contact with the oscillator. The oscillator includes an annular vibrating plate, and an annular piezoelectric element provided on a first surface of the vibrating plate. The vibrating plate is in contact with the moving member via a second surface of the vibrating plate, which is opposite the first surface. The piezoelectric element has a plurality of drive phase electrodes. When a driving region represents a region of the oscillator in which the drive phase electrodes are provided, and a non-driving region represents a remaining region of the oscillator, a contact area ratio S1 between the vibrating plate and the moving member in the non-driving region is less than a contact area ratio S2 between the vibrating plate and the moving member in the driving region.

8 Claims, 13 Drawing Sheets

(56) References Cited

U.S. PATENT DOCUMENTS

2017/0153531 A1* 6/2017 Kubota ............... H01L 41/1878
2017/0155031 A1  6/2017 Furuta et al.
2017/0155343 A1  6/2017 Uebayashi et al.

* cited by examiner

VIBRATION WAVE MOTOR, DRIVE CONTROL SYSTEM, AND OPTICAL APPARATUS

BACKGROUND OF THE INVENTION

Field of the Invention

The present invention relates to a vibration wave motor, and a drive control system and an optical apparatus in which the vibration wave motor is used.

Description of the Related Art

A vibration type (vibrating wave) actuator has an oscillator which is configured such that if an electrical signal such as alternating voltage is applied to an electromechanical energy conversion element such as a piezoelectric element, an elastic body having an annular shape, elliptical shape, or bar shape joined to the element is excited to vibrate. The vibration type actuator is used as a vibration wave motor in which the elastic body (moving member) in press contact with the oscillator moves relative to the oscillator (still body) via a driving force induced by excited vibration of the oscillator.

Hereinbelow, the structure and the driving principle of a vibration wave motor having an annular shape, which is a representative form of vibration type actuator usage, will be schematically described. Hereinbelow, an "annular shape" of an article or member can be schematically regarded as the shape of a circular plate having a predetermined thickness, which has a concentrically circular through hole. The dimension of the article or member having the annular shape, which is equivalent to the thickness of the circular plate, refers the "thickness" of the article or member. Surfaces of the article or member having the annular shape, which are equivalent to both surfaces of the circular plate in a thickness direction, refer to "surfaces" of the article or member individually or collectively.

The vibration wave motor having an annular shape includes an oscillator (stator) having an annular shape, and a moving member (rotor) having an annular shape which has the center of the annulus as substantially the same axis as the oscillator, and which is in press contact with the oscillator via a pressing member. A vibration damping member such as felt is provided between the oscillator and the pressing member such that vibration of the oscillator does not become an unnecessary excitation source for the pressing member.

The moving member is an elastic body, and typically, the material of the moving member is metal. The oscillator includes a vibrating plate having an annular shape, and a piezoelectric element having an annular shape which is provided on one surface of the vibrating plate. The vibrating plate is an elastic body, and typically, the material of the vibrating plate is metal. The piezoelectric element has an electrode that is divided into a plurality of regions of one surface of a piezoelectric ceramic having an annular shape along a circumferential direction of the annulus, and one common electrode on the other surface of the piezoelectric ceramic. Typically, the material of the piezoelectric ceramic is a lead zirconate titanate.

The electrode divided into the plurality of regions includes at least two regions forming drive phase electrodes; at least one region forming a vibration detecting electrode; and a region forming as a non-driving phase electrode which is provided whenever necessary. A wiring is provided in each drive phase electrode to input power for applying an electric field to a corresponding region of the piezoelectric ceramic having an annular shape, which is in contact with each drive phase electrode. The wiring is connected to a driving circuit that outputs a driving electrical signal. A wiring is also provided in the vibration detecting electrode. A vibrating wave signal detected in a corresponding region of the piezoelectric ceramic having an annular shape is output to the driving circuit, which will be described later.

It is assumed that there is a circle passing through an arbitrary position on a plane of the piezoelectric element having an annular shape, and having the center of the annulus in common with the piezoelectric element. If the circumference of the circle is equally divided into n arcs, the length of one arc is represented by $\lambda$, and a circumferential length is represented by $n\lambda$. A polarizing treatment is applied to a region (corresponding to a region forming each drive phase electrode) on the piezoelectric ceramic in such a way as to alternately apply reverse electric fields to the region in the thickness direction at a pitch of $\lambda/2$ along the circumferential direction. For this reason, when electric fields applied to the entirety of the region in the thickness direction have the same direction, polarities for expansion and contraction in the region of the piezoelectric ceramic are alternately reversed at a pitch of $\lambda/2$. If the drive phase electrodes are formed of two regions such as A phase and B phase regions, two drive phase electrodes are disposed in such a way as to be spaced away from each other by an odd multiple of the distance $\lambda/4$ in the circumferential direction. Typically, the non-drive phase electrode (G phase) shorted to the common electrode is provided in each of two regions (gap portions) (partitioning two drive phase electrodes from each other) such that piezoelectric vibration is not spontaneously generated. An electric field is not applied to the regions of the piezoelectric ceramic. Typically, the vibration detecting electrode (S phase) is provided in the gap portion, which will be described later.

If an alternating voltage is applied as a driving electrical signal to only one drive phase electrode of the vibration wave motor having two drive phase electrodes, a first standing wave having a wavelength of $\lambda$ is generated over the entire circumference of the oscillator. Similarly, if an alternating voltage is applied to only another drive phase electrode, a second standing wave is generated, and the position of the wave is rotated relative to the position of the first standing wave by $\lambda/4$ in the circumferential direction. If two types of alternating voltages having the same frequency and a temporal phase difference of $\pi/2$ are applied to the drive phase electrodes, respectively, as a result of the combination of both standing waves, a bending vibrating (vibration having an amplitude vertical to a surface of the oscillator) traveling wave (having a wave number of n along the annulus and a wavelength of $\lambda$) traveling in the circumferential direction is generated over the entire circumference of the oscillator.

If the bending vibrating traveling wave (hereinbelow, may be simply referred to as "bending vibrating wave") is generated, because each point of a surface of the vibrating plate of the oscillator is subjected to an elliptical motion, the moving member in contact with the surface receives a circumferential frictional force (driving force) from the vibrating plate, and rotates reverse to a traveling direction of the traveling wave. It is possible to reverse the direction of rotation of the traveling wave by switching the phase difference of an alternating voltage applied to each drive phase electrode from a positive value to a negative value or vice versa. It is possible to control the speed of rotation of the traveling wave by changing the frequency, magnitude, or phase difference of an alternating voltage applied to each drive phase electrode.

The wave number n of the traveling wave is determined based on an output power required for the vibration wave motor, the diameter or width of the piezoelectric element, limitations to the driving circuit for applying alternating voltages to the drive phase electrodes, and the natural frequency (which becomes one factor of drive noises which are "disturbing noises") of a configuration member or peripheral member of the vibration wave motor. Because piezoelectric vibration is not spontaneously generated in the gap portion, typically, the size of the gap portion is designed to be as small as possible. The smaller the wave number n becomes, the greater the occupancy ratio of the gap portions to the entire circumference of the piezoelectric element becomes.

If an alternating voltage having a frequency greater than the resonance frequency of the oscillator is applied to the drive phase electrodes, a rotation operation starts. As the frequency approaches the resonance frequency, the vibration amplitude of the oscillator increases, and the rotation accelerates. Typically, the frequency is swept from a frequency greater than a resonance frequency to the resonance frequency such that the vibration wave motor is driven at a desired rotational speed.

The generated bending vibrating wave is capable of being detected by the vibration detecting electrode provided in the gap portion. That is, the distortion of a deformation (vibration) generated in the piezoelectric ceramic in contact with the vibration detecting electrode is converted into an electrical signal in response to the magnitude of the distortion, is output to the driving circuit via the vibration detecting electrode, and is used for feedback control.

Japanese Patent Application Laid-Open No. S63-240382 discloses a technique in which the bending rigidity of an oscillator is reduced and is capable of being greatly displaced by providing a plurality of slits having a constant width in a vibrating plate having an annular shape in a radial direction of the vibrating plate, and an increase in the output power of a vibration wave motor and an improvement in the efficiency of the vibration wave motor are obtained by efficiently exciting bending vibration and reducing mechanical losses of the oscillator.

Japanese Patent Application Laid-Open No. H03-230771 discloses a method in which a phase difference between an alternating voltage applied to a drive phase electrode (A phase or B phase) and an S phase voltage detected by a vibration detecting electrode is prevented from being shifted depending on a rotational direction, and a resonance frequency is accurately detected by disposing the vibration detecting electrode in the center of a portion of a vibrating plate, the rigidity of which changes in response to a change in the depth or width of each slit of the vibrating plate, or disposing the vibration detecting electrode in a portion other than the portion of the vibrating plate, the rigidity of which changes.

SUMMARY OF THE INVENTION

When the traveling wave is generated in the vibration wave motor having an annular shape, if a driving region represents a region of the oscillator in which each drive phase electrode is provided, and a non-driving region represents a remaining region of the oscillator, because a traveling wave traveling reverse to a traveling wave traveling in a desired circumferential direction is generated in the vicinity of the non-driving region and a driving force is reduced, an ideal driving efficiency is not capable of being obtained, and power consumption becomes excessively large. The present invention is made to solve the problems, and provides a vibration wave motor realizing an improved driving efficiency and a reduced power consumption, and a drive control system and an optical apparatus in which the vibration wave motor is used.

In the present invention, in order to solve the problems, there is provided a vibration wave motor including an oscillator having an annular shape; and a moving member having an annular shape, in which the oscillator has a vibrating plate having an annular shape which is in contact with the moving member, and a piezoelectric element, in which the piezoelectric element has a plurality of drive phase electrodes, and in which when a driving region represents a region of the oscillator in which each drive phase electrode is provided, and a non-driving region represents a remaining region of the oscillator, a contact area ratio S1 between the vibrating plate and the moving member in the non-driving region is less than a contact area ratio S2 between the vibrating plate and the moving member in the driving region.

In the vibration wave motor of the present invention for solving the problems, the value of S1/S2 which is the ratio of S1 to S2 is less than or equal to 0.97.

In the present invention, in order to solve the problems, there is provided a drive control system including at least the vibration wave motor; and a driving circuit electrically connected to the vibration wave motor.

In the drive control system of the present invention for solving the problems, the driving circuit has a signal generation unit that generates a 7th bending vibrating wave in the oscillator.

In the present invention, in order to solve the problems, there is provided an optical apparatus including at least the drive control system; and an optical member dynamically connected to the vibration wave motor.

In the present invention, in order to solve the problems, there is provided an apparatus including the vibration wave motor; and a driven member capable of being driven by the vibration wave motor.

In the present invention, in order to solve the problems, there is provided a vibration wave motor including an oscillator having an annular shape; and a moving member having an annular shape, in which the oscillator has a vibrating plate having an annular shape which is in contact with the moving member, and a piezoelectric element, in which the piezoelectric element has a plurality of drive phase electrodes, and in which when a driving region represents a region of the oscillator in which each drive phase electrode is provided, and a non-driving region represents a remaining region of the oscillator, a frictional force A of a portion of the vibrating plate in contact with the moving member in the non-driving region is less than a frictional force B of a portion of the vibrating plate in contact with the moving member in the driving region.

In the present invention, in order to solve the problems, there is provided a vibration wave motor including an oscillator having an annular shape; and a moving member having an annular shape, in which the oscillator has a vibrating plate having an annular shape which is in contact with the moving member, and a piezoelectric element, in which the piezoelectric element has a plurality of drive phase electrodes, and in which when a driving region represents a region of the oscillator in which each drive phase electrode is provided, and a non-driving region represents a remaining region of the oscillator, a frictional coefficient α of a portion of the vibrating plate in contact with the moving member in the non-driving region is less than a frictional coefficient β of a portion of the vibrating plate in contact with the moving member in the driving region.

In the present invention, because the contact area ratio S1 between the vibrating plate and the moving member in the non-driving region is set to be less than the contact area ratio S2 between the vibrating plate and the moving member in the driving region, it is possible to provide the vibration wave motor realizing an improved driving efficiency and a reduced power consumption, and the drive control system and the optical apparatus in which the vibration wave motor is used.

Further features of the present invention will become apparent from the following description of exemplary embodiments with reference to the attached drawings.

DESCRIPTION OF THE EMBODIMENTS

Hereinbelow, a vibration wave motor, a drive control system, and an optical apparatus of one embodiment of the present invention will be described with reference to the drawings. The present invention is not limited to the following embodiment, and can be realized in other various forms as long as the other forms do not depart from the concept or major features of the present invention.

(Vibration Wave Motor)

A vibration wave motor of the present invention includes an oscillator having an annular shape, and a moving member having an annular shape which is provided so as to be in press contact with the oscillator. The oscillator includes a vibrating plate having an annular shape, and a piezoelectric element having an annular shape which is provided on a first surface of the vibrating plate. The vibrating plate is in contact with the moving member via a second surface of the vibrating plate, which is opposite of the first surface. The piezoelectric element has a plurality of drive phase electrodes. When a driving region represents a region of the oscillator in which each drive phase electrode is provided, and a non-driving region represents a remaining region of the oscillator, a contact area ratio S1 between the vibrating plate and the moving member in the non-driving region is less than a contact area ratio S2 between the vibrating plate and the moving member in the driving region.

(Annular Shape)

In the present invention, as described above, the annular shape schematically refers to the shape of a circular plate having a predetermined thickness, which can be regarded as having a concentrically circular through hole. Ideally, the outer circumferential shape of the circular plate and the through hole is a true circle. Examples of a circle include an ellipse and an oval as long as the ellipse and the oval can be schematically regarded as a circle. If the circle is not a true circle, the radius or diameter of the circle is determined on the assumption that the circle is a true circle having the same area as the area of the circle. In the present invention, examples of the annular shape also include substantially annular shapes such as an annular shape having a missing part, an annular shape having a cutaway part, and an annular shape having a protruding part as long as the annular shape can be substantially regarded as an annular shape. In the present invention, an example of the annular shape also includes a substantially annular shape slightly modified due to production variations as long as the annular shape can be substantially regarded as an annular shape. If the annular shape is a substantially annular shape, the radius or diameter of the annular shape is determined on the assumption that the annular shape is a true circle obtained from the complementation of a defect portion or abnormal portion of the substantially annular shape.

Figure 1A:
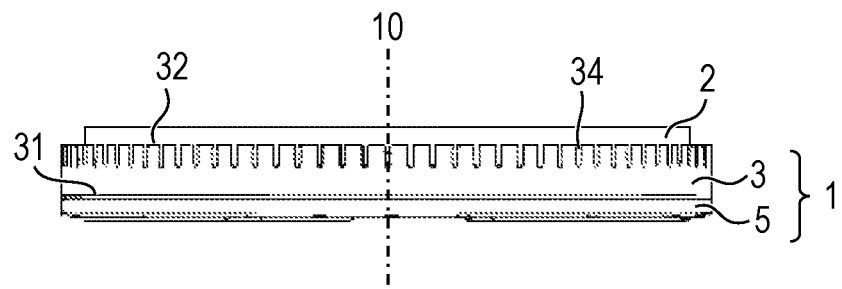
FIGS. 1A and 1B are schematic views illustrating the entire configuration of a vibration wave motor according to one embodiment of the present invention.
Figure 1B:
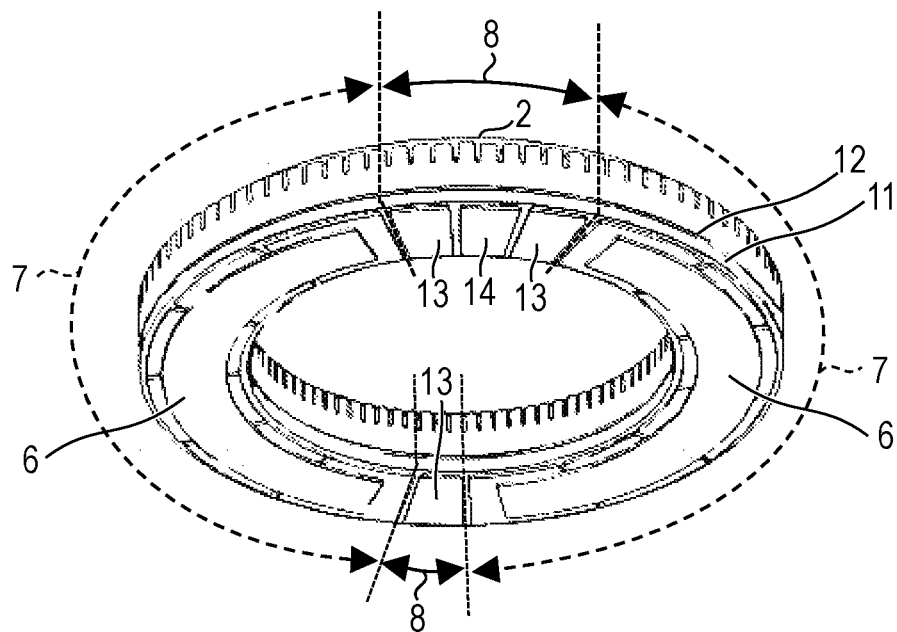

(FIGS. 1A and 1B)

FIG. 1A is a schematic side view illustrating the entire configuration of the vibration wave motor according to one embodiment of the present invention as seen from the side. FIG. 1B is a schematic perspective view as a region where a plurality of electrodes (pattern electrodes) are provided is seen. In any one of the drawings, a vibration damping member and a pressing member are not illustrated as being seen through. The side referred herein corresponds to a position that is spaced away from the annulus in a radial direction.

The vibration wave motor of the present invention includes an oscillator 1 having an annular shape, and a moving member 2 having an annular shape which is provided so as to be in press contact with the oscillator 1. The oscillator 1 includes a vibrating plate 3 having an annular shape, and a piezoelectric element 5 having an annular shape which is provided on a first surface 31 of the vibrating plate 3. The vibrating plate 3 is in contact with the moving member 2 via a second surface 32 of the vibrating plate 3, which is opposite of the first surface 31. The piezoelectric element 5 has a plurality of drive phase electrodes 6. When a driving region 7 represents a region of the oscillator 1 in which each drive phase electrode 6 is provided, and a non-driving region 8 represents a remaining region of the oscillator 1, the contact area ratio S1 between the vibrating plate 3 and the moving member 2 on the second surface 32 in the non-driving region 8 is less than the contact area ratio S2 between the vibrating plate 3 and the moving member 2 on the second surface 32 in the driving region 7.

(Oscillator)

As illustrated in FIG. 1A, the oscillator 1 includes the vibrating plate 3 having an annular shape, and the piezoelectric element 5 having an annular shape which is provided on the first surface 31 of the vibrating plate 3. The oscillator 1 is in contact with the moving member 2 via the second surface 32 of the vibrating plate 3.

The vibrating plate 3 and the moving member 2 have the center of each annulus as substantially the same axis (rotary axis 10). The moving member 2 is in press contact with the second surface 32 of the vibrating plate 3. Because the contact area ratio S1 between the vibrating plate 3 and the moving member 2 on the second surface 32 in the non-driving region 8 is less than the contact area ratio S2 between the vibrating plate 3 and the moving member 2 on the second surface 32 in the driving region 7, a traveling wave traveling reverse to a desired circumferential direction is less transmitted to the moving member 2. As a result, it is possible to improve a driving efficiency, and reduce power consumption.

As one example of other methods of improving the driving efficiency, there is a method of reducing a frictional force in the non-driving region. If a frictional force A of a portion of the vibrating plate 3 in contact with the moving member 2 in the non-driving region is set to be less than a frictional force B of a portion of the vibrating plate 3 in contact with the moving member 2 in the driving region, a traveling wave generated in a direction reverse to the desired circumferential direction is less transmitted to the moving member 2. As a result, it is possible to improve the driving efficiency, and reduce the power consumption.

The frictional force in the non-driving region may be reduced in any method. As an example, there is a method of setting a frictional coefficient α of the portion of the vibrating plate 3 in contact with the moving member 2 in the non-driving region to be less than a frictional coefficient β of the portion of the vibrating plate 3 in contact with the moving member 2 in the driving region.

As a method of improving the driving efficiency in such a way that a traveling wave generated in the reverse direction is less transmitted to the moving member 2, only the method of setting the contact area ratio S1 to be less than the contact area ratio S2 may be used, or only the method of setting the frictional force A to be less than the frictional force B may be used. Only the method of setting the frictional coefficient α to be less than a frictional coefficient β may be used. The methods may be used in combination with each other.

A plurality of slits or cavities is capable of being provided in the second surface 32 because the plurality of slits or cavities reduces the bending rigidity of the oscillator, and the vibrating plate 3 is largely displaced during bending vibration. A technique of adjusting the contact area ratio is not limited to the technique of providing the slits or cavities. Any technique may be used as long as the contact area ratio is capable of being substantially changed by the technique.

The first surface 31 of the vibrating plate 3 is capable of being a flat surface because vibration induced by the expansion and contraction of the piezoelectric element 5 becomes well transmitted. The center of the annulus of the vibrating plate 3 is capable of coinciding with the center of the annulus of the piezoelectric element 5 because vibration becomes well transmitted.

A technique of providing the piezoelectric element 5 on the first surface 31 of the vibrating plate 3 is not limited to a specific technique. The piezoelectric element 5 is capable of being in close contact with the first surface 31 of the vibrating plate 3 directly or via a highly elastic material (not illustrated) such that the transmission of vibration is not prevented. An epoxy resin is capable of being used as a bonding layer.

If the outer circumference of the vibrating plate 3 does not have a simple shape, but a plurality of outer diameters depending on measurement locations, the maximum outer diameter is set to 2R.

As illustrated in FIG. 1B, the piezoelectric element 5 having an annular shape has one piece of piezoelectric ceramic 11 having an annular shape; a common electrode 12 provided on a surface (facing the vibrating plate 3) of the piezoelectric ceramic 11; the plurality of drive phase electrodes 6 provided on a surface (opposite of the surface on which the common electrode 12 is provided) of the piezoelectric ceramic 11; a non-drive phase electrode 13; and a vibration detecting electrode 14.

If alternating voltages with different phases are applied to the plurality of drive phase electrodes 6, the piezoelectric element 5 generates a traveling wave on the second surface 32 of the vibrating plate 3. As a result, the moving member 2 having an annular shape in press contact with the second surface 32 moves (rotates) relatively around a central axis (rotary axis 10) of the annulus.

(Contact Area Ratio)

In the present invention, when the slits or cavities are not provided in the second surface 32 of the vibrating plate 3, if an area of the second surface 32 in contact with the moving member 2 is assumed to 1, the contact area ratio is the ratio of a contact area therebetween when the slits or cavities are provided to the area of 1. Because the driving region typically is a driving source, the driving region is provided over a circumference longer than a circumference over which the non-driving region is provided. Because the ratio of a circumferential length of the driving region to a circumferential length of the non-driving region is changed depending on a wave number n, it is necessary to obtain the contact area ratio for each of the driving region and the non-driving region.

As described above, when S1 represents the contact area ratio between the vibrating plate and the moving member in the non-driving region, and S2 represents the contact area ratio between the vibrating plate and the moving member in the driving region, it is possible to prevent the generation of a reverse traveling wave, improve the driving efficiency, and reduce the power consumption by setting S1 to be less than S2. S1 is set to be to some extent less than S2 to realize the effects. The ratio S1/S2 is capable of being less than or equal to 0.97. On the other hand, if S1 is lowered too much, the rigidity of the oscillator in the non-driving region 8 may decrease, the vibrating plate 3 and the moving member 2 in contact with each other may not be uniformly pressed against each other, and a frictional driving force may decrease due to a decrease in contact area between the vibrating plate 3 and the moving member 2, thereby causing problems with the driving of the vibration wave motor, which will be described later. The problematic value of S1/S2 differs depending on a factor such as the material or inner and outer diameters of the oscillator 1 or the moving member 2, the uniformity of pressing applied by a pressing member 9, the order of a traveling wave, or a driving voltage. In many cases, S1/S2 is capable of being greater than or equal to 0.80.

When the vibrating plate 3 and the moving member 2 are already in contact with each other, it is difficult to accurately measure the contact area therebetween. It is possible to measure the contact area using a pressure sensitive paper interposed between the vibrating plate 3 and the moving member 2. When the vibrating plate 3 and the moving member 2 are not yet in contact with each other, it is possible to measure the area of the second surface 32 of the vibrating plate 3 using a laser microscope. If it is difficult to actually measure the area, the area may be calculated based on a design dimension and differences between the design dimension and a finished dimension obtained from an actual processing.

(Protruding Portion & Groove Portion)

FIGS. 2A to 2D are schematic partial side views illustrating a detailed configuration of the vibration wave motor according to one embodiment of the present invention as seen from the side. FIG. 2E is a schematic partial side view comparatively illustrating a detailed configuration of a vibration wave motor according to one embodiment in the related art as seen from the side.

As illustrated in FIGS. 1A and 1B and FIGS. 2A to 2E, the second surface 32 of the vibrating plate 3 in contact with the moving member 2 has a plurality of the groove portions 34, each of which has a U-shaped cross section and radially extends from the center (rotary axis 10 and refer to FIG. 1A) of the vibrating plate 3 having an annular shape. The "U-shaped cross section" refers to a cross section having both wall surfaces and a bottom surface which are substantially vertical and substantially horizontal relative to the second surface 32 of the vibrating plate 3, respectively. Examples of the U-shaped cross section include not only a so-called U-shaped cross section in which the bottom surface and each wall surface are connected to each other at a smoothly rounded corner, but also a cross section that has a so-called equivalent U shape and can be widely regarded as the "U-shaped cross section", for example, a so-called rectangular cross section in which the bottom surface and each wall surface are connected to each other at right angles, a cross section having an intermediate shape between a U shape in which the bottom surface and each wall surface are connected to each other at a smoothly rounded corner and a rectangular shape in which the bottom surface and each wall surface are connected to each other at right angles, or a cross section having a modification shape of the foregoing shapes. In the present invention, the width of the groove portion 34 indicates a width between central points of the second surface 32 of the vibrating plate 3 in a radial direction of the vibrating plate. As described above, the depth of the groove portion 34 may be set depending on a driving voltage or frequency, the rigidity of the oscillator, or the degree of pressing such that the vibrating plate 3 is largely displaced during bending vibration without causing problems with the driving of the vibration wave motor. The depth of the groove portion is capable of being greater than or equal to 5% and less than or equal to 50% of the thickness of the vibrating plate.

A partitioning wall portion is formed between two adjacent groove portions 34 to partition two adjacent groove portions 34 from each other. An upper surface of the partitioning wall portion is equivalent to the second surface 32 of the vibrating plate 3, and serves as a reference surface for defining the depth of each groove portion. Because the partitioning wall portion can be regarded as a portion protruding from the groove portion 34 that is a recession, the partitioning wall portion is referred to as a "protruding portion". That is, it is referred that the moving member 2 is capable of moving relative to the oscillator 1 in press contact with the moving member 2 via a driving force induced by friction between the moving member 2 and upper surfaces of the protruding portions 33. Hereinbelow, for descriptive purposes, in principle, a region between the groove portions 34 is not referred to as a "partitioning wall portion" but a "protruding portion". In the present invention, the width of the upper surface of each protruding portion indicates a width between central points of the second surface 32 of the vibrating plate 3 in the radial direction of the vibrating plate. In the present invention, a direction toward the first surface 31 of the vibrating plate 3 represents a direction in which the height of each protruding portion decreases from a reference surface, that is, the second surface 32 of the vibrating plate 3. The height of each protruding portion is represented by a − (minus) distance from the reference surface having a height of zero.

As illustrated in FIG. 2E, the plurality of groove portions 34 having the same shape and a plurality of the protruding portions 33 having the same shape are formed on a side (in contact with the moving member 2) of the vibrating plate 3 of the vibration wave motor in the related art.

In the present invention, the contact area ratio S1 between the vibrating plate 3 and the moving member 2 in the non-driving region is less than the contact area ratio S2 between the vibrating plate 3 and the moving member 2 in the driving region.

Figure 2A:
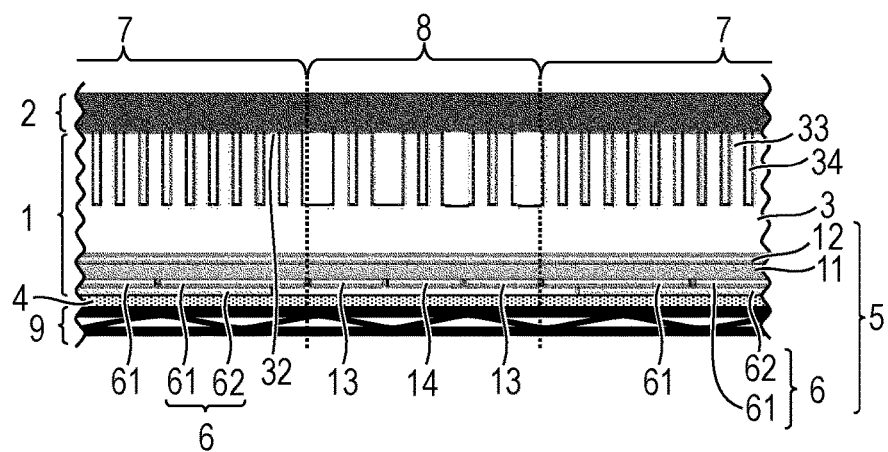
FIGS. 2A, 2B, 2C and 2D are schematic partial side views illustrating a detailed configuration of the vibration wave motor according to one embodiment of the present invention as seen from the side.

As illustrated in FIG. 2A, as one form of setting S1 to be less than S2, it can be considered that the width of each groove portion 34 in the non-driving region 8 is set to be greater than the width of each groove portion 34 in the driving region 7. In this manner, even though the width of the upper surface of each protruding portion 33 is the same in both the driving region 7 and the non-driving region 8, it is possible to set the contact area ratio S1 in the non-driving region 8 to be less than the contact area ratio S2 in the driving region 7. The protruding portions 33 are not necessarily provided in the non-driving region 8. In this case, the entirety of the non-driving region 8 becomes the groove portion 34, and the contact area ratio S1 becomes zero. Therefore, the width of each groove portion 34 in the non-driving region 8 may be set to be greater than the width of each groove portion 34 in the driving region 7, and less than or equal to a region width of the non-driving region 8. When the width of each groove portion 34 in the non-driving region 8 or the occupancy ratio of the groove portions 34 to the non-driving region 8 is raised too much, the rigidity of the oscillator in the non-driving region 8 may decrease, the vibrating plate 3 and the moving member 2 in contact with each other may be uniformly pressed against each other, a frictional driving force may decrease due to a decrease in contact area between the vibrating plate 3 and the moving member 2, thereby causing problems with the driving of the vibration wave motor. Therefore, depending on a factor such as the material or inner and outer diameters of the oscillator 1 or the moving member 2, the uniformity of pressing applied by the pressing member 9, the order of a traveling wave, or a driving voltage, it is necessary to adjust the width of each groove portion 34 or the number of the groove portions 34 in the non-driving region 8, or the occupancy ratio of the groove portions 34 to the non-driving region 8.

Figure 2B:
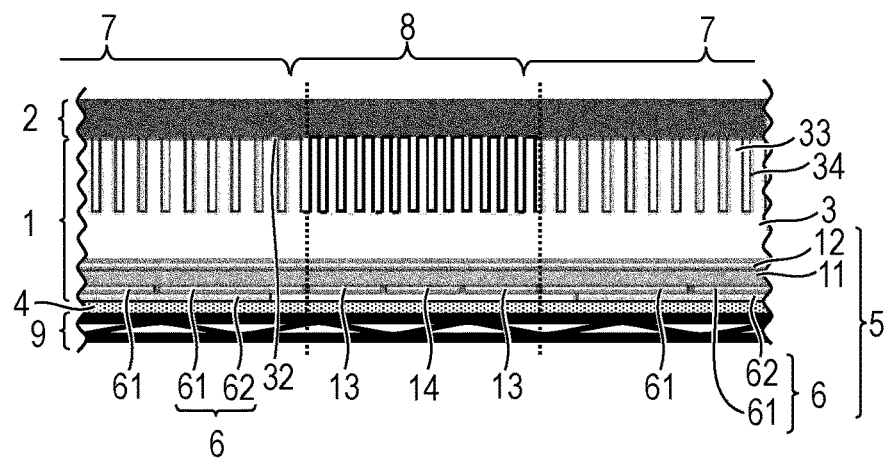

As illustrated in FIG. 2B, as another form of setting S1 to be less than S2, it can be considered that the width of the upper surface of each protruding portion 33 in the non-driving region 8 is set to be less than the width of the upper surface of each protruding portion 33 in the driving region 7. In this manner, even though the width of the upper surface of each groove portion 34 is the same in both the driving region 7 and the non-driving region 8, it is possible to set the contact area ratio S1 in the non-driving region 8 to be less than the contact area ratio S2 in the driving region 7. Also in this form, the protruding portions 33 are not necessarily provided in the non-driving region 8. In other words, the width of the upper surface of each protruding portion 33 may be zero, or the width of the upper surface of each protruding portion 33 in the non-driving region 8 may be less than the width of the upper surface of each protruding portion 33 in the driving region 7. Also in this form, as described above, the rigidity of the oscillator in the non-driving region 8 may decrease, the vibrating plate 3 and the moving member 2 in contact with each other may not be uniformly pressed against each other, and a frictional driving force may decrease due to a decrease in contact area between the vibrating plate 3 and the moving member 2, thereby causing problems with the driving of the vibration wave motor. For this reason, depending on a factor such as the material of the oscillator 1 or the moving member 2, or the uniformity of pressing applied by the pressing member 9, it is necessary to adjust the width of the upper surface of each protruding portion 33 or the number of the protruding portions 33 in the non-driving region 8, or the contact ratio of the protruding portions 33 in the non-driving region 8.

Figure 2C:
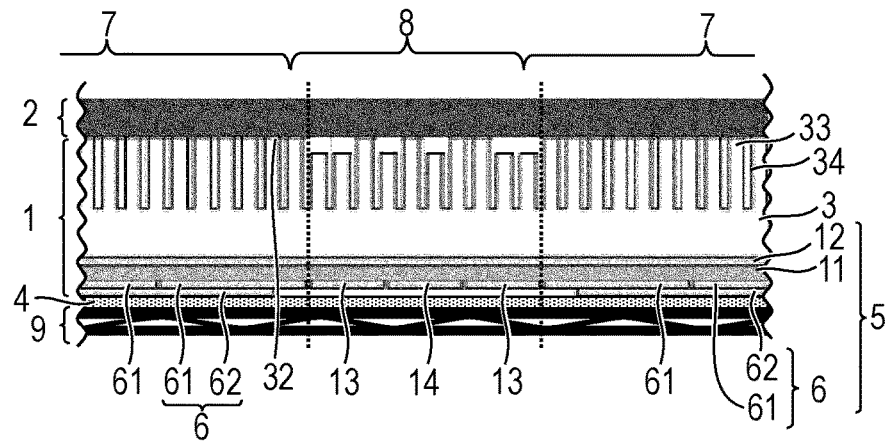

As illustrated in FIG. 2C, as another form of setting S1 to be less than S2, it can be considered that the number of the protruding portions 33 in contact with the moving member 2 in the non-driving region 8 is set to be less than the number of the protruding portions 33 in contact therewith in the driving region 7 by lowering the height of the upper surface of each protruding portion 33 in the non-driving region 8. It is necessary to adjust the height of the upper surface to the extent that the upper surfaces of the protruding portions 33 do not come into contact with the moving member 2 even during driving. Depending on a factor such as the material of the oscillator 1 or the moving member 2 or a vibration amplitude of the oscillator 1 during driving, it is necessary to adjust the height of the upper surface of each protruding portion 33. The height is capable of being lowered by 10 times or greater than the maximum vibration amplitude of the oscillator 1 in the driving region 7 in a direction in which the protruding portions 33 come into contact with the moving member 2. Also in this form, as described above, the rigidity of the oscillator in the non-driving region 8 may decrease, the vibrating plate 3 and the moving member 2 in contact with each other may not be uniformly pressed against each other, and a frictional driving force may decrease due to a decrease in contact area between the vibrating plate 3 and the moving member 2, thereby causing problems with the driving of the vibration wave motor. For this reason, depending on a factor such as the material of the oscillator 1 or the moving member 2 or the uniformity of pressing applied by the pressing member 9, it is necessary to adjust the height of the upper surface of each protruding portion 33 in the non-driving region 8. In reality, it is not easy to measure the vibration amplitude when the oscillator 1 is in press contact with the moving member 2, and in many cases, the maximum vibration amplitude is expected to be in the range of some µm. For this reason, the height of the upper surface of each protruding portion 33 in the non-driving region 8 may be lowered by 100 µm or greater as long as the lowered height does not cause problems with the driving of the vibration wave motor. As long as a lowered height does not cause problems with the driving of the vibration wave motor, the height of the upper surface of each protruding portion 33 may be set to be the same as the height of a bottom portion of each groove portion, that is, the height may be lowered such that there exist no protruding portions.

The features of the present invention are capable of being realized by a combination of the forms. Depending on the material or diameter of the piezoelectric element 5 or the vibrating plate 3, the wave number of a traveling wave in use, or the number of the protruding portions 33 of the vibrating plates 3, a form may be selected to allow the driving efficiency to improve the most.

Figure 2D:
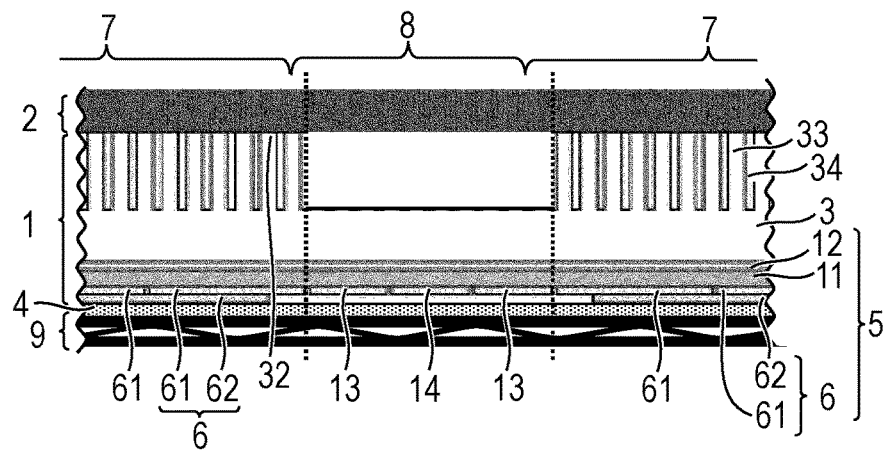
Figure 2E:
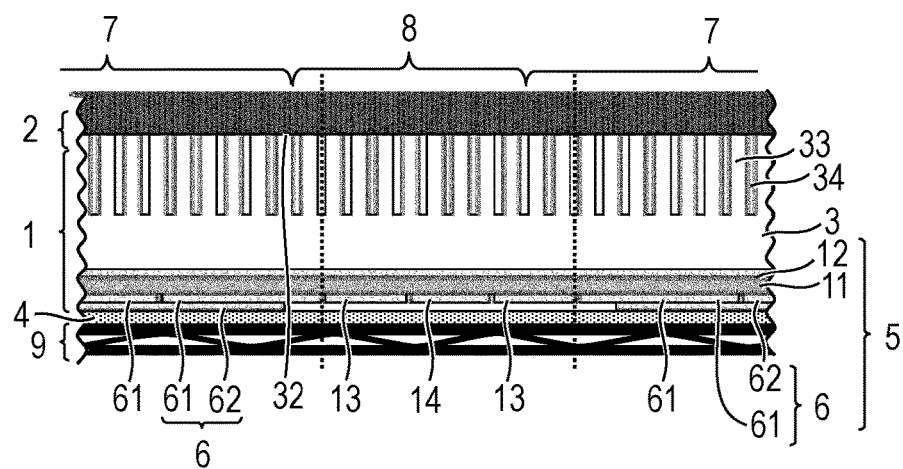
FIG. 2E is a schematic partial side view illustrating a detailed configuration of a vibration wave motor in the related art as seen from the side.

If the circumferential length of the vibrating plate 3 is designed to be short, and λ is designed to be too short, a region width λ/4 of a gap portion may become too small. In this case, as one form, it can be also considered that in addition to setting the contact area ratio S1 between the vibrating plate 3 and the moving member 2 in the non-driving region 8 to be less than the contact area ratio S2 between the vibrating plate 3 and the moving member 2 in the driving region 7, as illustrated in FIG. 2D, the entirety of the non-driving region 8 is formed as the groove portion 34 and the protruding portion 33 is not provided. This form also is one form of realizing the features of the present invention. The protruding portions 33 may not be necessarily required, and the contact area ratio S1 in the non-driving region may be zero.

(Moving Member)

Because the moving member 2 having an annular shape is brought into press contact with the second surface 32 of the vibrating plate 3 having an annular shape by the pressing member 9, a driving induced by vibration generated in a contact surface of the moving member 2 in contact with the oscillator 1 is well transmitted, and the moving member 2 rotates. The contact surface of the moving member 2 in contact with the oscillator 1 is capable of having a flat shape. The material of the moving member 2 is capable of being an elastic body, and the material is capable of being metal. Aluminum is capable of being used as the material of the moving member 2. An alumite treatment (anodizing) may be applied to the surface of aluminum. A portion of the moving member 2 which is in contact with the second surface 32 of the vibrating plate 3 may be structured to have spring properties, for example, may have a beam shape. As one of preferred forms of improving a frictional driving force on the contact surface of the moving member 2 in contact with the oscillator 1, the contact surface is designed to have a rail shape having a certain width.

(Piezoelectric Ceramic)

In the present invention, one piece of the piezoelectric ceramic 11 implies a ceramic that is a seamless ingot (bulk body) having a uniform composition which is capable of being obtained by sintering raw material powder containing a metal element, and that has a piezoelectric constant $d_{31}$ at a room temperature equal to an absolute value of 10 pm/V or a piezoelectric constant $d_{33}$ greater than or equal to 30 pC/N.

It is possible to obtain a piezoelectric constant of a piezoelectric ceramic via calculation based on the results of measurement of the density, the resonance frequency, and the anti-resonance frequency of the ceramic according to Japan Electronics and Information Technology Industries Association standard (JEITA EM-4501). Hereinbelow, this method is referred to as a resonance and antiresonance method. It is possible to measure the density using an Archimedes method. It is possible to measure the resonance frequency and the antiresonance frequency using an impedance analyzer after providing a pair of electrodes in the ceramic.

Typically, a ceramic is a collection of fine crystals (also referred to as a polycrystal), and the crystal one by one includes an atom having a positive charge and an atom having a negative charge. Many ceramics are in a state where positive charges and negative charges are in balance. However, among dielectric ceramics, there is a ferroelectric ceramic in which positive and negative charges of crystals are unbalanced even in a natural state and charges are biased (spontaneously polarized). After being sintered, the ferroelectric ceramic has diverse spontaneous polarization directions, and it is apparently seen that charges in the entirety of the ceramic are not biased. If a high voltage is applied to the ferroelectric ceramic, the spontaneous polarization directions are aligned in a uniform direction. Even though the voltage is removed, the ferroelectric ceramic does not return to the original state. Typically, the alignment of spontaneous polarization directions is referred to as a polarizing treatment. If a voltage is applied from the outside to the ferroelectric ceramic to which the polarizing treatment is applied, the centers of positive and negative charges inside the ceramic pull or push back external charges, thereby allowing a ceramic body to stretch and contract (converse piezoelectric effect). In the present invention, one piece of the piezoelectric ceramic 11 is a ceramic in which the converse piezoelectric effect is induced by the application of the polarizing treatment thereto. The polarizing treatment is applied to at least a partial region of one piece of the piezoelectric ceramic 11.

(Lead Content of Piezoelectric Ceramic)

The piezoelectric ceramic 11 has a lead content of less than 1,000 ppm, that is, is capable of being a lead-free piezoelectric ceramic.

The majority of piezoelectric ceramics in the related art contain lead zirconate titanate as a main constituent. For this reason, it is pointed out that when a piezoelectric element is disposed of and exposed to acid rains, or is left over in severe environments, a lead constituent in the piezoelectric ceramic in the related art may dissolve into the soil and cause harm to the ecosystem. If a lead content is less than 1,000 ppm as in the piezoelectric ceramic 11 of the present invention, even though the piezoelectric element is disposed of and exposed to acid rains, or is left over in severe environments, the content level of a lead constituent of the piezoelectric ceramic 11 has a negligible impact on the environment. It is possible to evaluate the lead content of the piezoelectric ceramic 11 as a lead content relative to the total weight of the piezoelectric ceramic 11 which is quantified by X-ray fluorescence (XRF) analysis or ICP emission spectroscopy.

(Perovskite-Type Metal Oxide)

A main constituent of the piezoelectric ceramic 11 having a lead content of less than 1,000 ppm is capable of being a metal oxide (perovskite-type metal oxide) having a perovskite-type crystal structure.

In the present invention, the perovskite-type metal oxide indicates a metal oxide having a perovskite structure (also referred to as a perofskite structure) that ideally is a cubic structure as described in the fifth edition of Iwanami Dictionary of Physics and Chemistry (Published on Feb. 20, 1998 by Iwanami Shoten). A metal oxide having a perovskite structure is typically expressed by the chemical equation of $ABO_3$. The mole ratio of a B-site element to an element O is typically expressed as 1:3, but even though an element quantity ratio in a metal oxide slightly shifts from the ratio (for example, from 1.00:2.94 to 1.00:3.06), if a main phase of the metal oxide is a perovskite structure, the metal oxide is referred to as a perovskite-type metal oxide. It is possible to determine whether a metal oxide has a perovskite structure, based on structure analysis by X-ray diffraction or electron beam diffraction.

In the perovskite-type metal oxide, elements A and B are in the form of ions, and occupy specific positions of unit lattices called as an A site and a B site, respectively. In the unit lattice of a cubic crystal system, the element A is positioned at the vertex of a cube, and the element B is positioned at a body center. The element O occupies a face-center position of the cube as an anion. If the coordinates of the element A, the element B, and the element O are slightly shifted from the respective symmetrical positions of the unit lattice, the unit lattice having a perovskite structure is distorted, thereby causing the unit lattice in a tetragonal crystal system, a rhombohedral crystal system, or an orthorhombic crystal system.

Examples of a combination of the valences of an A-site ion and a B-site ion include $A^+B^{5+}O^{2-}{}_3$, $A^{2+}B^{4+}O^{2-}{}_3$, and $A^{3+}B^{3+}O^{2-}{}_3$, and the metal oxide may be a solid solution in which the valences are combined together. Each of the valences may be an average valence of a plurality of ions positioned at the same site.

(Common Electrode)

As illustrated in FIG. 1B, the common electrode 12 is provided on a surface (facing the vibrating plate 3) of one piece of the piezoelectric ceramic 11 having an annular shape, that is, on a surface of the piezoelectric ceramic 11, which is in contact with the vibrating plate 3 or the bonding layer described above. The common electrode 12 is disposed in such a way as to resemble the surface of the piezoelectric ceramic 11 and have an annular shape. If the common electrode 12 is capable of being conducted with the non-drive phase electrode 13, a driving voltage is capable of being applied only via the drive phase electrode 6. If a wiring is provided in such a way as to be in contact with both of the common electrode 12 and the non-drive phase electrode 13, both of the common electrode 12 and the non-drive phase electrode 13 are capable of being conducted together. Alternatively, a wiring may be provided such that the common electrode 12 and the non-drive phase electrode 13 are conducted together via the vibrating plate 3 having conductivity.

The wiring is capable of being formed by coating a wiring with metal paste such as silver, and drying or baking the resultant wiring.

(Drive Phase Electrode)

Figure 3:
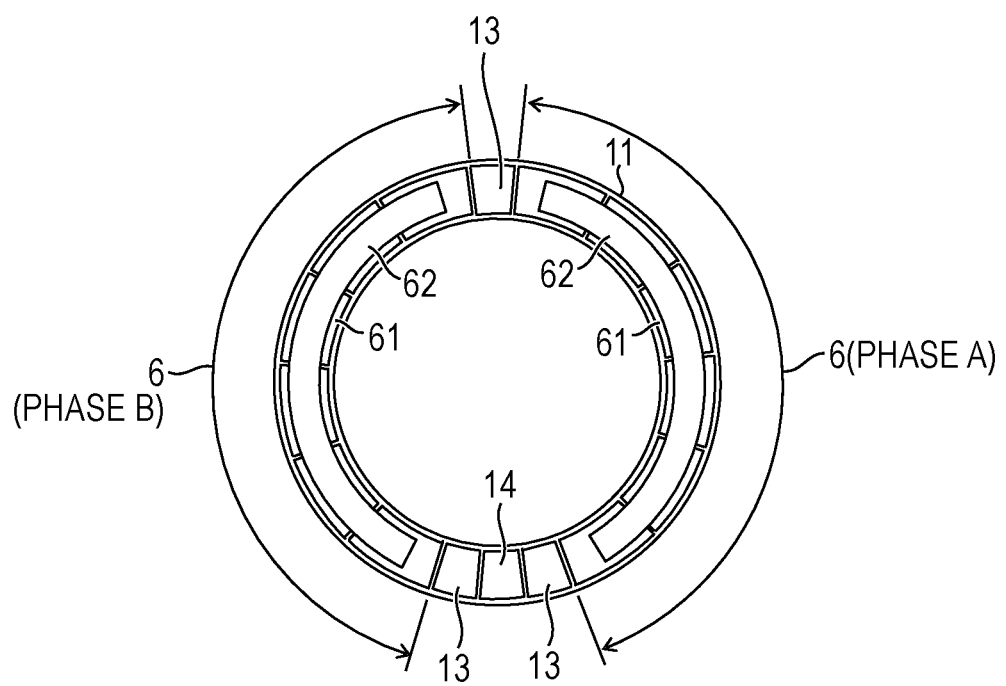
FIG. 3 is a view illustrating how polarizable electrodes and connection electrodes of a piezoelectric ceramic according to one embodiment of the present invention are disposed.

As illustrated in FIG. 3, each of the drive phase electrodes 6 includes a plurality of polarizable electrodes 61, and a connection electrode 62 that electrically connects together the plurality of polarizable electrodes 61. The drive phase electrode 6, the non-drive phase electrode 13, and the vibration detecting electrode 14 are not capable of being conducted together such that each of the drive phase electrode 6, the non-drive phase electrode 13, and the vibration detecting electrode 14 is capable of having an independent potential during driving.

Figure 4:
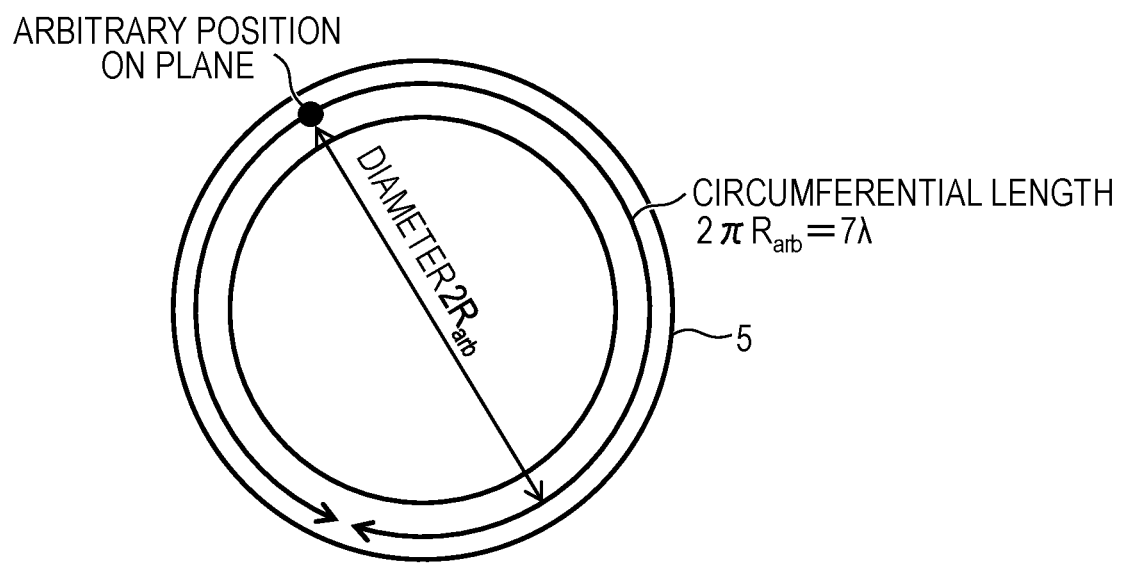
FIG. 4 is a schematic view illustrating a relationship between a circumferential length of a piezoelectric element having an annular shape used in the vibration wave motor of the present invention and a wavelength of a vibrating wave.

FIG. 4 is a schematic view illustrating a relationship between a circumferential length of the piezoelectric element 5 having an annular shape in the vibration wave motor of the present invention and a wavelength of a vibrating wave. In FIG. 4, the electrodes are not illustrated for illustrative purposes. In the drawing, an annulus represents the piezoelectric element 5, and has substantially the same shape as the shape of the piezoelectric ceramic 11. If an arbitrary position is designated on a plane of the annulus, and a circle having the same center as the annular shape of the piezoelectric element 5 and passing through the arbitrary position has a diameter of $2R_{arb}$ (unit: mm), a circumferential length of the circle is $2\pi R_{arb}$. The circumferential length of $2\pi R_{arb}$ is $n\lambda$. In the present invention, $\lambda$ represents a wavelength of an n-th (n: wave number) bending vibrating traveling wave generated in a circumferential direction of the oscillator 1 of the vibration wave motor of the present invention. The value of $\lambda$ differs depending on the designated arbitrary position, and the assumption of the parameter $\lambda$ is done to design the shape and the size of each of the drive phase electrode 6, the non-drive phase electrode 13, and the vibration detecting electrode 14. Hereinafter, unless otherwise specified, a circumferential length is assumed to be the circumferential length of a circle passing through an arbitrary position on a plane of the piezoelectric element 5.

Figure 5A:
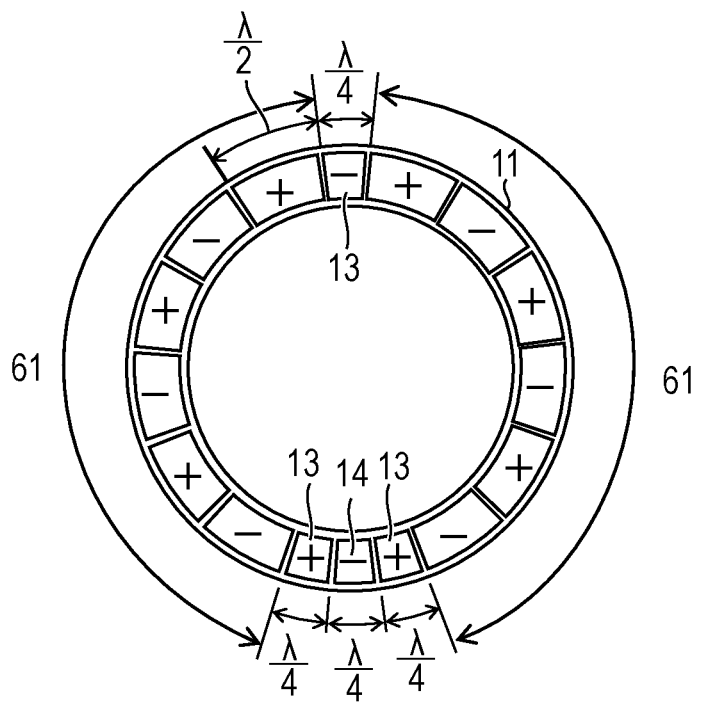
FIGS. 5A and 5B are schematic views illustrating how the polarizable electrodes are disposed in the piezoelectric element having an annular shape used in the vibration wave motor of the present invention, and illustrating a polarity of each electrode portion of the piezoelectric ceramic.
Figure 5B:
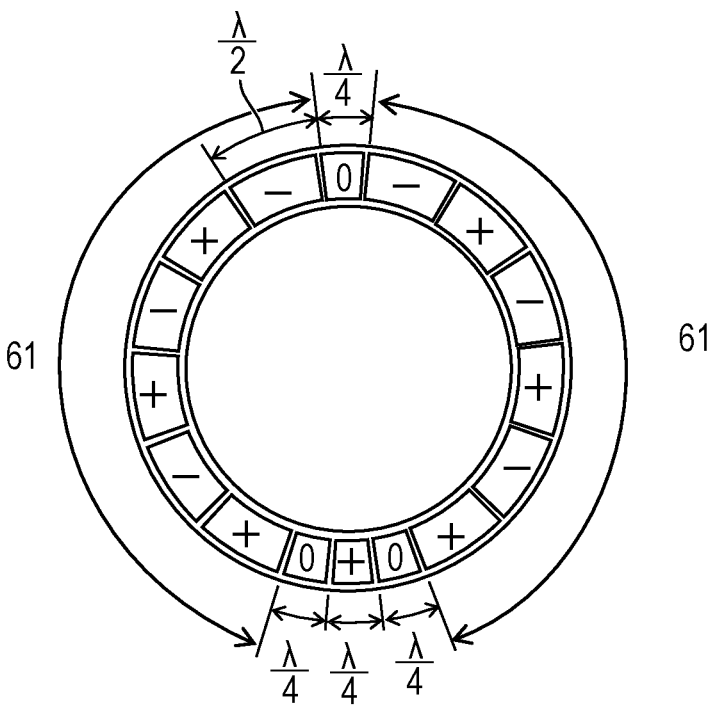

FIGS. 5A and 5B are schematic views illustrating how the polarizable electrodes 61 are disposed in the piezoelectric element 5 having an annular shape used in the vibration wave motor of the present invention, and illustrating a polarity of each electrode portion of the piezoelectric ceramic 11, and illustrating a side of the piezoelectric element 5 having an annular shape, on which the plurality of electrodes are provided. In FIGS. 5A and 5B, the connection electrode 62 is not illustrated for illustrative purposes. FIGS. 5A and 5B illustrate one example of a combination of polarities, and the present invention is not limited to the illustrated combination of polarities.

A portion of the piezoelectric ceramic 11 in contact with the drive phase electrode 6 has remnant polarization in a direction substantially vertical to the drive phase electrode 6. The region having remnant polarization may be part or the entirety of a region of the piezoelectric ceramic 11, which is interposed between the polarizable electrode 61 and the common electrode 12. The entire region interposed between the polarizable electrode 61 and the common electrode 12 is capable of having remnant polarization from the viewpoint of increasing power generated by the drive of the vibration wave motor. In the present invention, the region having remnant polarization is referred to as a polarizing portion. The remnant polarization indicates polarization that remains in the piezoelectric ceramic 11 when a voltage applied to the piezoelectric ceramic 11 is removed. If the polarizing treatment is applied to the piezoelectric ceramic 11, a spontaneous polarization direction becomes aligned with a voltage application direction, and the piezoelectric ceramic 11 has remnant polarization. It is possible to specify whether the piezoelectric ceramic 11 has remnant polarization by applying an electric field E between the electrodes interposing the piezoelectric element 5 therebetween, and measuring the applied electric field E and a polarization amount P (P-E hysteresis curve).

Each of the drive phase electrodes 6 has the plurality of polarizable electrodes 61, and correspondingly, the piezoelectric ceramic 11 has the same number of portions in contact with the polarizable electrodes 61 as the number of the polarizable electrodes 61, that is, the number of the polarizing portions also is the same as the number of the polarizable electrodes 61. As illustrated in FIGS. 5A and 5B, the plurality of polarizing portions and the plurality of polarizable electrodes 61 are disposed along a circumference while interposing non-polarizing portions therebetween. The polarities of the polarizing portions are alternately reversed in the sequence where the polarizing portions are disposed along the circumference. In FIGS. 5A and 5B, "+" and "−" signs written inside each of the polarizable electrodes 61 represent remnant polarization directions, that is, polarities. In the present patent specification, because the "+" symbol is written for an electrode portion to which a positive voltage is applied in the polarizing treatment of a manufacturing step for the piezoelectric element 5, if the piezoelectric constant $d_{33}$ is measured only at the "+" electrode portion, a negative value is detected. Similarly, the piezoelectric constant $d_{33}$ detected at the "−" electrode portion is a positive value. In FIG. 5B, the piezoelectric constant $d_{33}$, which is detected at a room temperature only in an electrode portion represented by "0" symbol or in a non-polarizing portion in which the electrodes are not provided, is zero or a very small value, for example, a value of 5 pC/N or less. In the piezoelectric element 5 exemplified in FIGS. 5A and 5B, the piezoelectric ceramic has a region having remnant polarization downward relative to the drawing sheet, and a region having remnant polarization upward relative thereto. As a method of confirming the polarity of remnant polarization which is changed depending on regions, there are a method of determining the polarity of remnant polarization based on whether the value of a piezoelectric constant detected via measurement is positive or negative, and a method of confirming whether a shift direction is reversed relative to the origin of a coercive field in the P-E hysteresis curve.

The polarizing portions have substantially the same size, that is, the plurality of polarizable electrodes 61 (including the polarizable electrodes 61 of other drive phase electrodes 6) are capable of having the same circumferential length. The difference in projected area between the polarizing portions (polarizable electrodes 61) is capable of being less than 2%.

More specifically, each of the polarizable electrodes 61 has a fan shape, and if the non-polarizing portions are neglected, ideally, the circumferential length of the polarizable electrode 61 is $\lambda/2$. In practice, each non-polarizing portion is present between adjacent the polarizable electrodes 61 to prevent the adjacent regions from being shorted to each other when the adjacent regions are polarized to have polarities different from each other. In this case, ideally, the distance between the center (starting point) of a non-polarizing portion and the center of the next non-polarizing portion, which is positioned across the polarizable electrode 61 adjacent to the non-polarizing portion in the circumferential direction, is set to $\lambda/2$. A length tolerance of less than approximately 2% is allowable. The volume of the non-polarizing portions is capable of being reduced as much as possible from the viewpoint of increasing a driving force generated by the drive of the vibration wave motor. Each non-polarizing portion interposed between adjacent polarizable electrodes 61 is in contact with the connection electrode 62.

If two drive phase electrodes are provided, ideally, the circumferential length of each of the drive phase electrodes

6 is (n−1) λ/2. In practice, because a gap in which no electrode is provided is required to avoid the drive phase electrode 6 from being shorted to the non-drive phase electrode 13 or vibration detecting electrode 14 adjacent to the drive phase electrode 6, the circumferential length of the drive phase electrode 6 may be slightly less than (n−1) λ/2. In practice, in many cases, the circumferential length is approximately 1 to 2.5% less than (n−1) λ/2.

Because the circumferential length of the circle passing through the arbitrary position on the plane of the piezoelectric element 5 is nλ, if two drive phase electrodes 6 are provided and gaps between the electrodes are neglected, a remaining circumferential length except for two drive phase electrodes 6 is λ. The remaining circumferential length of λ is divided by the number of one or more non-drive phase electrodes 13 plus the number of one or more vibration detecting electrodes 14. Because two drive phase electrodes 6 have to be disposed in such a way as to be spaced away from each other by an odd multiple of the distance λ/4 in the circumferential direction, two drive phase electrodes 6 are spaced away from each other in the circumferential direction by two gap portions that have a circumferential length of λ/4 and a circumferential length of 3λ/4, respectively. Both of the non-drive phase electrode 13 and the vibration detecting electrode 14 have to be provided in two gap portions. For this reason, the phases of standing waves generated in two drive phase electrodes 6, for example, the positions of nodes are shifted from each other by λ/4, and the piezoelectric element 5 having an annular shape is capable of forming a bending vibrating wave in the circumferential direction of the oscillator 1. The reason the bending vibrating wave is formed is that if a voltage is simultaneously applied to the polarizable electrodes 61 via the connection electrode 62, one group of the polarizing portions (alternately disposed and having polarities different from each other) expands and the other group contracts in a thickness direction of the piezoelectric element 5.

That is, if alternating voltages having a frequency which is the natural frequency of the oscillator 1 are applied to only a portion interposed between one driving phase (A phase) electrode 6 and the common electrode 12 in the vibration wave motor of the present invention, standing waves having a wavelength of λ are generated on a surface of the vibrating plate 3 over the entire circumference along the circumferential direction. If the same alternating voltages are applied to only a portion interposed between another driving phase (B phase) electrode 6 and the common electrode 12, the same standing waves are generated. The positions of nodes of the standing waves are shifted from each other by λ/4 in the circumferential direction of the vibrating plate 3.

When the vibration wave motor is driven, alternating voltages having a frequency which is the natural frequency of the oscillator 1 are applied to two driving phase (A phase and B phase) electrodes 6 of the vibration wave motor of the present invention such that the alternating voltages have the same frequency and a temporal phase difference of π/2. As a result of the combination of two standing waves, an n-th traveling wave having a wavelength of λ traveling in the circumferential direction is generated in the vibrating plate 3.

(Vibration Detecting Electrode)

The vibration detecting electrode 14 is provided to detect a vibration state of the oscillator 1, and feedback vibration state information to the outside, for example, a driving circuit. The polarizing treatment is applied to a portion of the piezoelectric ceramic 11 in contact with the vibration detecting electrode 14. For this reason, if the vibration wave motor is driven, a voltage is generated in the vibration detecting electrode 14 in response to the magnitude of distortion of the oscillator 1, and is output to the outside as a detection signal.

(Non-Drive Phase Electrode)

At least one or more of the non-drive phase electrodes 13 are capable of being conducted with the common electrode 12 because the non-drive phase electrodes 13 are capable of being used as ground electrodes. A preferred form or technique for achieving conduction is as described above. Because all of the drive phase electrode 6, the non-drive phase electrode 13 as a ground electrode, and the vibration detecting electrode 14 are provided on one surface (surface opposite to the surface on which the common electrode 12 is provided) of the piezoelectric element 5 having an annular shape, the vibration wave motor easily exchanges electrical signals (driving signal and detection signal) with the driving circuit outside the vibration wave motor. A driving signal and a detection signal are capable of being exchanged via a flexible printed substrate or rigid flexible substrate.

If the vibration wave motor is electrically connected to the driving circuit via a flexible printed substrate, the flexible printed substrate is disposed in such a way as to be in contact with part of each of the drive phase electrodes 6, the non-drive phase electrode 13, and the vibration detecting electrode 14 on one surface (surface opposite to the surface on which the common electrode 12 is provided) of the piezoelectric element 5 having an annular shape. The flexible printed substrate or rigid flexible substrate not only has a high dimensional accuracy, but also is easily positioned using a jig or the like. The flexible printed substrate is capable of being connected to the vibration wave motor via thermocompression bonding using an epoxy adhesive. The flexible printed substrate is capable of being connected to the vibration wave motor via thermocompression bonding using anisotropic conductive paste (ACP) having conductivity or anisotropic conductive film (ACF) having conductivity, which is good for mass production because conduction failure is reduced or a process speed improves. If thermocompression bonding is used to connect the flexible printed substrate to the vibration wave motor, it is possible to select a temperature lower than a depolarization temperature of the piezoelectric ceramic 11.

A portion of the piezoelectric ceramic 11 in contact with the non-drive phase electrode 13 may or may not have remnant polarization. If a portion of the piezoelectric ceramic 11 in contact with the non-drive phase electrode 13 has remnant polarization, the non-drive phase electrode 13 is capable of being conducted with the common electrode 12.

(Characteristics and Materials of Electrodes and Method of Forming Electrodes)

Each of the polarizable electrode 61, the non-drive phase electrode 13, the vibration detecting electrode 14, and the connection electrode 62 is made of a layered or film type conductor having a resistance value of less than 10Ω or capable of having a resistance value of less than 1Ω. It is possible to evaluate the resistance value of each electrode by measuring the resistance value via a circuit tester (electric tester). The thickness of each electrode is in the range of 5 nm to 20 μm. The material of each electrode is not limited to a specific material, and a material typically used in a piezoelectric element may be used.

Examples of the material of each electrode include metals such as Ti, Pt, Ta, Ir, Sr, In, Sn, Au, Al, Fe, Cr, Ni, Pd, Ag, and Cu, and compounds of the metals. Each electrode may be made of one type of the material, or may be made of two or more types of the materials stacking on top of each other.

The electrodes disposed on the piezoelectric element may be made of different materials. Each electrode used in the present invention is capable of being an Ag paste electrode, a baked Ag electrode, or an electrode sputtered with Au and Ti because the electrodes have a small resistance value.

Drive Control System

Figure 6:
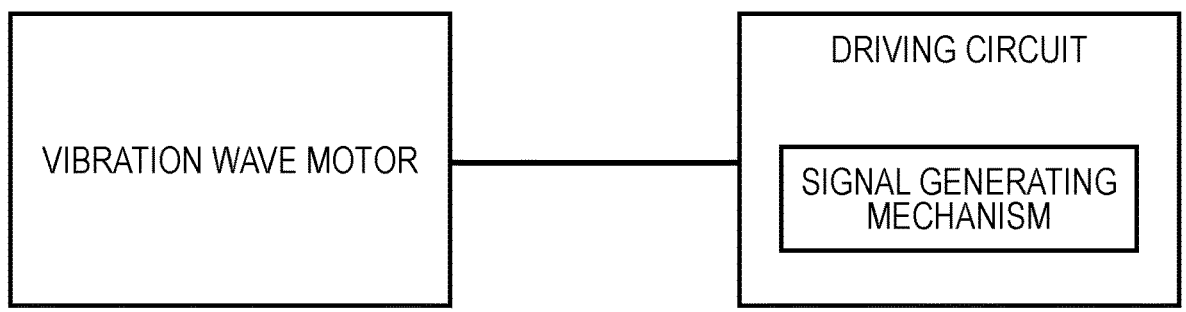
FIG. 6 is a schematic diagram illustrating a drive control system according to one embodiment of the present invention.

Subsequently, a drive control system of the present invention will be described. FIG. 6 is a schematic diagram illustrating the drive control system according to one embodiment of the present invention. The drive control system has at least the vibration wave motor of the present invention, and the driving circuit electrically connected to the vibration wave motor. The driving circuit has a built-in signal generation unit for generating electrical signals for generating an n-th bending vibrating wave in the vibration wave motor of the present invention and rotating the vibration wave motor.

The driving circuit simultaneously applies alternating voltages having the same frequency and a temporal phase difference of $\pi/2$ to the drive phase electrodes 6 (A phase and B phase) of the vibration wave motor. As a result, generated A phase and B phase standing waves are combined together, thereby generating an n-th bending vibrating wave (wavelength $\lambda$) traveling in the circumferential direction on the second surface 32 of the vibrating plate 3 illustrated in FIG. 1A.

Because each point on each of the protruding portions 33 of the vibrating plate 3 illustrated in FIGS. 2A to 2E is subjected to an elliptical motion, the moving member 2 rotates via a circumferential frictional force received from the vibrating plate 3. If the n-th bending vibrating wave is generated, the vibration detecting electrode 14 generates a detection signal in response to a vibration amplitude of a portion of the piezoelectric ceramic 11 in contact with the electrode, and outputs the signal to the driving circuit via a wiring. The driving circuit determines a shift from a resonance state by comparing the phase of the detection signal with the phase of a driving signal input to the drive phase electrode 6. The frequency of a driving signal to be input to the drive phase electrode 6 is determined from the shift information again, thereby enabling feedback control of the vibration wave motor.

(Optical Apparatus with Vibration Wave Motor)

Subsequently, the optical apparatus of the present invention will be described.

The optical apparatus of the present invention has at least the drive control system in which the vibration wave motor of the present invention is used, and an optical member dynamically connected to the vibration wave motor. In the present patent specification, the "dynamical connection" indicates a state where one member is in contact with the other member directly or via a third member, such that a force generated by a change in the coordinate, volume, or shape of one member is transmitted to the other member.

Figure 7A:
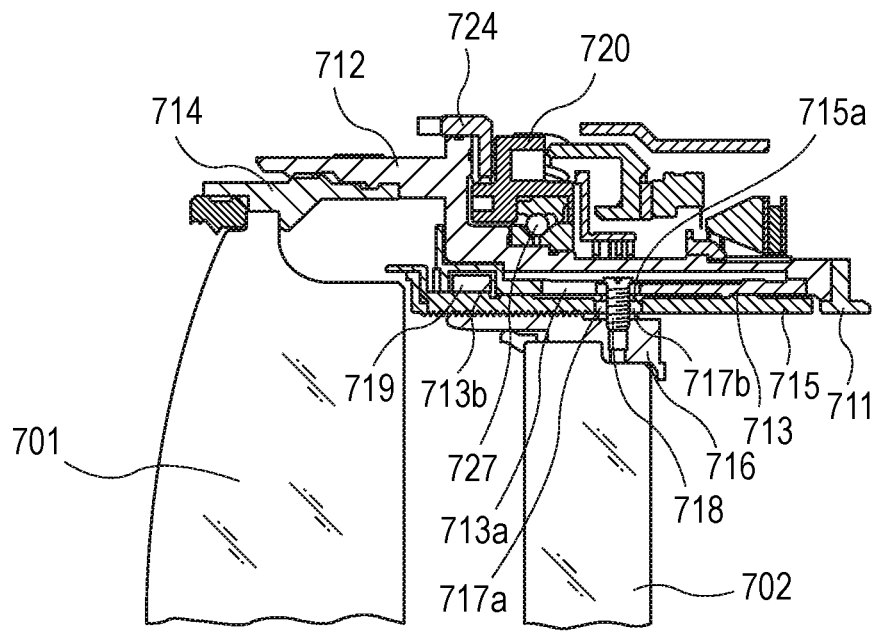
FIGS. 7A and 7B are cross-sectional views illustrating main parts of an interchangeable lens barrel of a single-lens reflex camera that is one example of a preferred embodiment of an optical apparatus of the present invention.
Figure 7B:
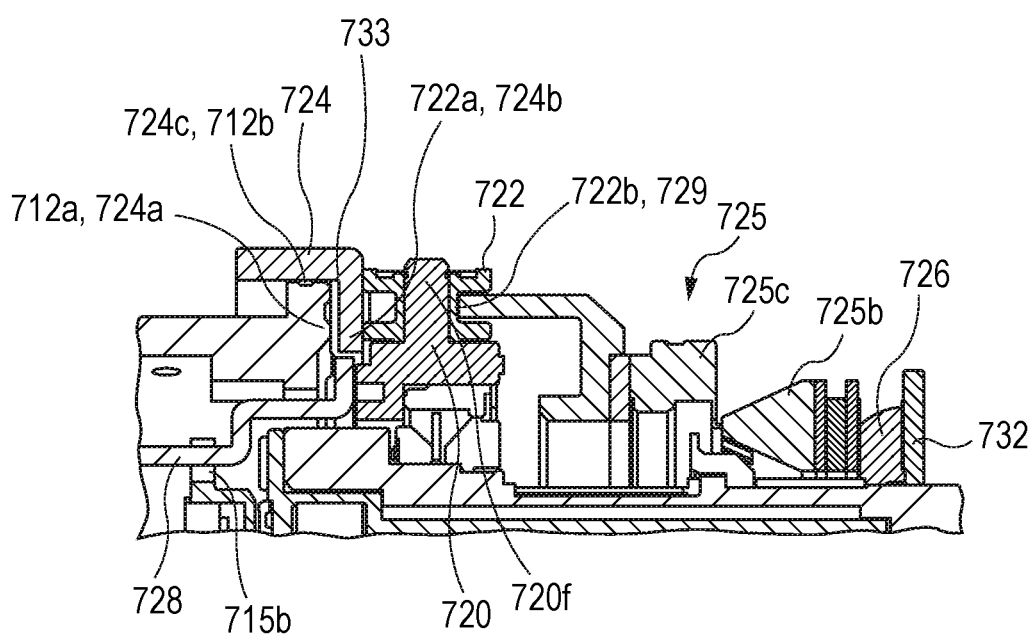
Figure 8:
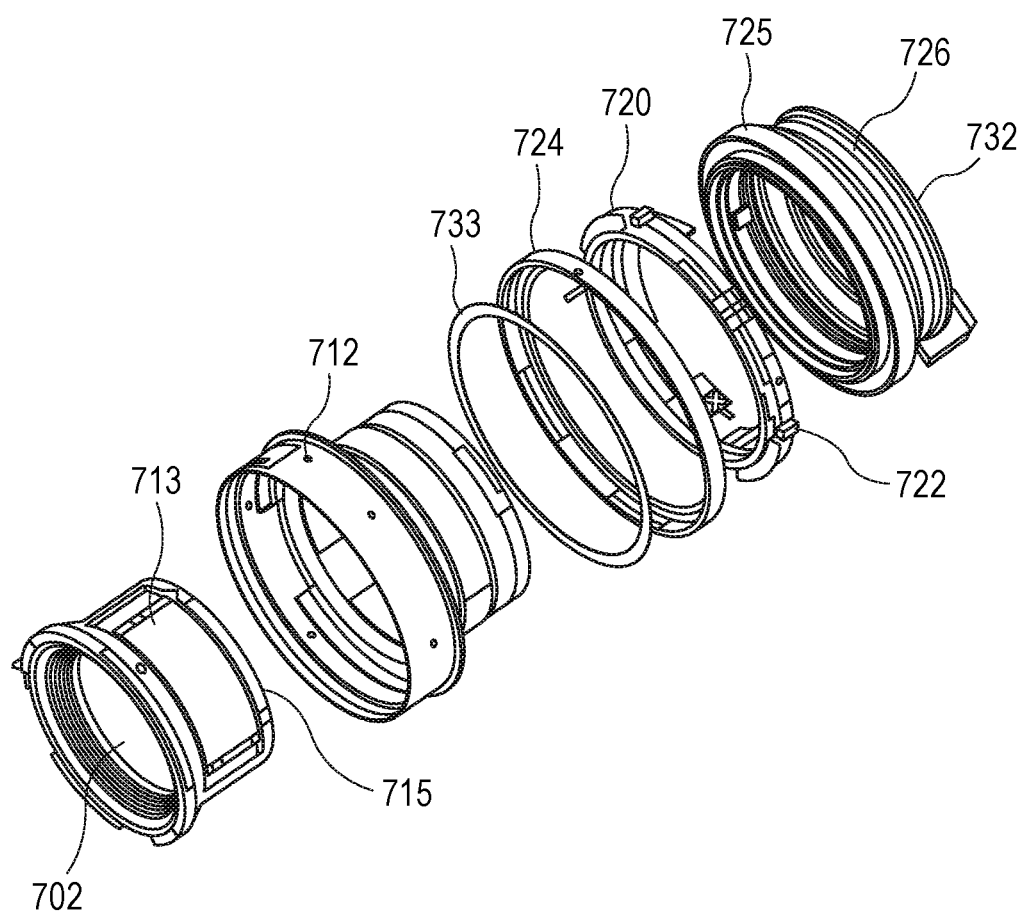
FIG. 8 is an exploded perspective view of the interchangeable lens barrel of the single-lens reflex camera that is one example of the preferred embodiment of the optical apparatus of the present invention.

FIGS. 7A and 7B are cross-sectional views illustrating main parts of an interchangeable lens barrel of a single-lens reflex camera that is one example of a preferred embodiment of the optical apparatus of the present invention. FIG. 8 is an exploded perspective view of the interchangeable lens barrel of the single-lens reflex camera that is one example of the preferred embodiment of the optical apparatus of the present invention. A fixed barrel 712, a straight travel guidance barrel 713, and a front group lens barrel 714 are fixed to a mount 711 attachable to and detachable from the camera. The fixed barrel 712, the straight travel guidance barrel 713, and the front group lens barrel 714 are fixed members of the interchangeable lens barrel. A front group lens is represented by 701.

A straight travel guidance groove 713a for a focus lens 702, which is for guidance in an optical-axis direction, is formed in the straight travel guidance barrel 713. Cam rollers 717a and 717b protruding radially outward are fixed to a rear group lens barrel 716 holding the focus lens 702 via a shaft screw 718, and the cam roller 717a is fitted into the straight travel guidance groove 713a.

A cam ring 715 is pivotably fitted into an inner circumference of the straight travel guidance barrel 713. Because a roller 719 fixed to the cam ring 715 is fitted into a circumferential groove 713b of the straight travel guidance barrel 713, a relative movement between the straight travel guidance barrel 713 and the cam ring 715 in the optical-axis direction is restricted. A cam groove 715a for the focus lens 702 is formed in the cam ring 715, and the cam roller 717b is fitted into the cam groove 715a.

A rotation transmitting ring 720 is disposed on an outer circumferential side of the fixed barrel 712, and is held by a ball race 727 in such a way as to be capable of rotating at a fixed position relative to the fixed barrel 712. A roller 722 is rotatably held by a shaft 720f of the rotation transmitting ring 720, which radially extends from the rotation transmitting ring 720. A large diameter portion 722a of the roller 722 is in contact with a mount side end surface 724b of a manual focus ring 724. A small diameter portion 722b of the roller 722 is in contact with a joining member 729. Six rollers 722 are disposed on an outer circumference of the rotation transmitting ring 720 while being equally spaced away from each other. Each roller is configured according to the foregoing relationship.

A low frictional sheet (washer member) 733 is disposed in an inner diameter portion of the manual focus ring 724. The low frictional sheet 733 is interposed between a mount side end surface 712a of the fixed barrel 712 and a front side end surface 724a of the manual focus ring 724. An outer diameter surface of the low frictional sheet 733 has a ring shape, and is fitted inside an inner diameter 724c of the manual focus ring 724. An outer diameter portion 712b of the fixed barrel 712 is fitted inside the inner diameter 724c of the manual focus ring 724. The low frictional sheet 733 serves to reduce friction of a rotating ring mechanism in which the manual focus ring 724 rotates around an optical axis relative to the fixed barrel 712.

The large diameter portion 722a of the roller 722 is in contact with the mount side end surface 724b of the manual focus ring while being pressed against each other by a force that is applied to press a vibration wave motor 725 forward of the lens by a wave washer 726. Similarly, the small diameter portion 722b of the roller 722 is also in contact with the joining member 729 while being appropriately pressed against each other by a force that is applied to press the vibration wave motor 725 forward of the lens by the wave washer 726. The wave washer 726 is restricted from moving toward the mount by a washer 732 that is bayonet coupled with the fixed barrel 712. A force (bias force) generated by the wave washer 726 is transmitted to the vibration wave motor 725, further to the roller 722, and is a force to press the manual focus ring 724 against the mount side end surface 712a of the fixed barrel 712. That is, the manual focus ring 724 is assembled in a state where the manual focus ring 724 is pressed against the mount side end surface 712a of the fixed barrel 712 via the low frictional sheet 733.

Therefore, if a control unit (not illustrated) causes the vibration wave motor 725 to rotate relative to the fixed barrel 712, because the joining member 729 is in friction contact with the small diameter portion 722b of the roller 722, the roller 722 rotates around the center of the shaft 720f. If the roller 722 rotates around the shaft 720f, as a result, the rotation transmitting ring 720 rotates around the optical axis (auto-focus operation).

If a rotary force is applied to cause the manual focus ring 724 to rotate around the optical axis by a manual operation input unit (not illustrated), the following operation is executed. That is, because the mount side end surface 724b of the manual focus ring 724 is in press contact with the large diameter portion 722a of the roller 722, the roller 722 rotates around the shaft 720f via a frictional force. If the large diameter portion 722a of the roller 722 rotates around the shaft 720f, the rotation transmitting ring 720 rotates around the optical axis. The vibration wave motor 725 does not rotate due to a frictional holding force between a rotor 725c and a stator 725b (manual-focus operation).

Two focus keys 728 are attached to the rotation transmitting ring 720 in such a way as to face each other. The focus key 728 is fitted into a notch portion 715b provided at a tip end of the cam ring 715. Therefore, if the auto-focus operation or the manual-focus operation is executed, and the rotation transmitting ring 720 rotates around the optical axis, a rotary force of the rotation transmitting ring 720 is transmitted to the cam ring 715 via the focus keys 728. If the cam ring 715 rotates around the optical axis, the cam roller 717b causes the rear group lens barrel 716 (the rotation of which is restricted by the cam roller 717a and the straight travel guidance groove 713a) to advance and retract along the cam groove 715a of the cam ring 715. Therefore, the focus lens 702 is driven, and a focus operation is executed. That is, the position of the focus lens 702, which is an optical member, is changed due to the focus lens 702 being dynamically connected to the vibration wave motor 725.

As the optical apparatus of the present invention, an interchangeable lens barrel of a single-lens reflex camera has been described above; however, the present invention is capable of being applied to an optical apparatus having a vibration wave motor as a driving unit, for example, regardless of the types of cameras, a compact camera, an electronic still camera, or a mobile information terminal with a camera.

EXAMPLES

In the following examples, the vibration wave motor, the drive control system, and the optical apparatus of the present invention will be described in more detail; however, the present invention is not limited to the following examples.
(Example of Manufacturing One Piece of Piezoelectric Ceramic Having Annular Shape)

One piece of piezoelectric ceramic having an annular shape and a lead content of less than 1,000 ppm was manufactured from a barium titanate material as follows.

A barium titanate, a calcium titanate, and a calcium zirconate, each of which had an average particle size of 300 nm or less and had a perovskite structure, were used as raw material powders and weighted such that Ba, Ca, Ti, and Zr had a composition of $(Ba_{0.84}Ca_{0.16})_{1.00}(Ti_{0.94}Zr_{0.06})O_3$. A barium carbonate and a titanium oxide were used to adjust the mole ratio of an A-site element to a B-site element. A trimanganese tetraoxide ($Mn_3O_4$) was added such that a Mn content becomes 0.14 parts by weight (which is a metal content) with respect to 100 parts by weight of the composition of $(Ba_{0.84}Ca_{0.16})_{1.00}(Ti_{0.94}Zr_{0.06})O_3$. Similarly, a bismuth oxide ($Bi_2O_3$) was added such that a Bi content becomes 0.18 parts by weight which is a metal content.

A mixed powder was obtained by mixing together the foregoing weighted powders in dry conditions for 24 hours using a ball mill. A granulated powder was obtained by sticking a PVA binder (3 parts by weight with respect to the total amount of the mixed powder) to the surface of the mixed powder using a spray dryer apparatus to granulate the obtained mixed powder.

Subsequently, a molded body having a round disc shape was manufactured by filling a mold with the obtained granulated powder and applying a molding pressure of 200 MPa using a press molding machine. The size of the mold used to mold a round disc shaped object had margins of 2 mm, 2 mm, and 0.5 mm for the outer diameter, the inner diameter, and the thickness of a piezoelectric ceramic that had a round disc shape and was a target object.

The obtained molded body was put into an electric furnace, held at the highest temperature of 1,340° C. for five hours, and sintered in the atmosphere for a total of 24 hours. Subsequently, one piece of piezoelectric ceramic having an annular shape with an outer diameter of 76.9 mm, an inner diameter of 67.2 mm, and a thickness of 0.5 mm was obtained by grinding a sintered body into an object having an annular shape with an outer diameter, an inner diameter, and a thickness which were desired.

The composition of the obtained piezoelectric ceramic was evaluated by ICP emission spectroscopy. As a result, the piezoelectric ceramics manufactured by the foregoing method had a lead content of less than 1 ppm. Results of the ICP emission spectroscopy and X-ray diffraction measurement were combined together, and thus it was comprehended that the composition of the piezoelectric ceramic had a perovskite metal oxide (capable of being expressed by the composition of $(Ba_{0.84}Ca_{0.16})_{1.00}(Ti_{0.94}Zr_{0.06})O_3$) as a main constituent, and contained 0.14 parts by weight of Mn and 0.18 parts by weight of Bi with respect to 100 parts by weight of the main constituent.
(Example of Manufacturing Piezoelectric Element)

FIGS. 9A to 9E are schematic process views illustrating one example of a method of manufacturing the piezoelectric element used in the vibration wave motor of the present invention.

As described above, the wave number n of a traveling wave is determined based on an output power required for the vibration wave motor, the diameter or width of the piezoelectric element, limitations to the driving circuit for applying alternating voltages to the drive phase electrodes, and the natural frequency (which becomes one factor of drive noises which are "disturbing noises") of a configuration member or peripheral member of the vibration wave motor. In the manufacturing example, the piezoelectric element generates a 7th bending vibrating traveling wave; however, the scope of the present invention is not limited to this example.

Figure 9A:
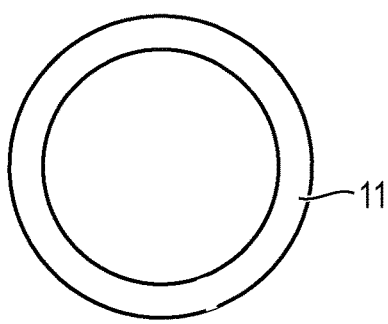
FIGS. 9A, 9B, 9C, 9D and 9E are schematic process views illustrating one example of a method of manufacturing the piezoelectric element used in the vibration wave motor of the present invention.
Figure 9B:
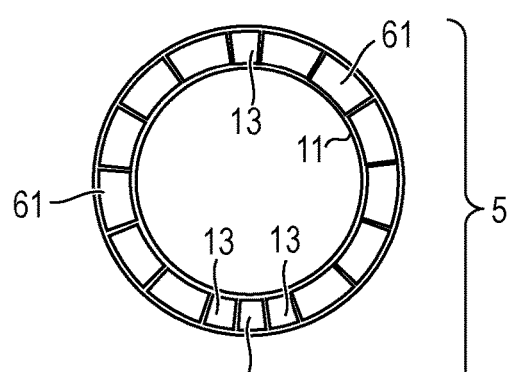
Figure 9C:
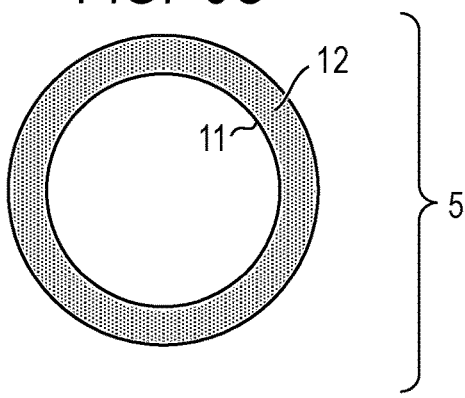
Figure 12:
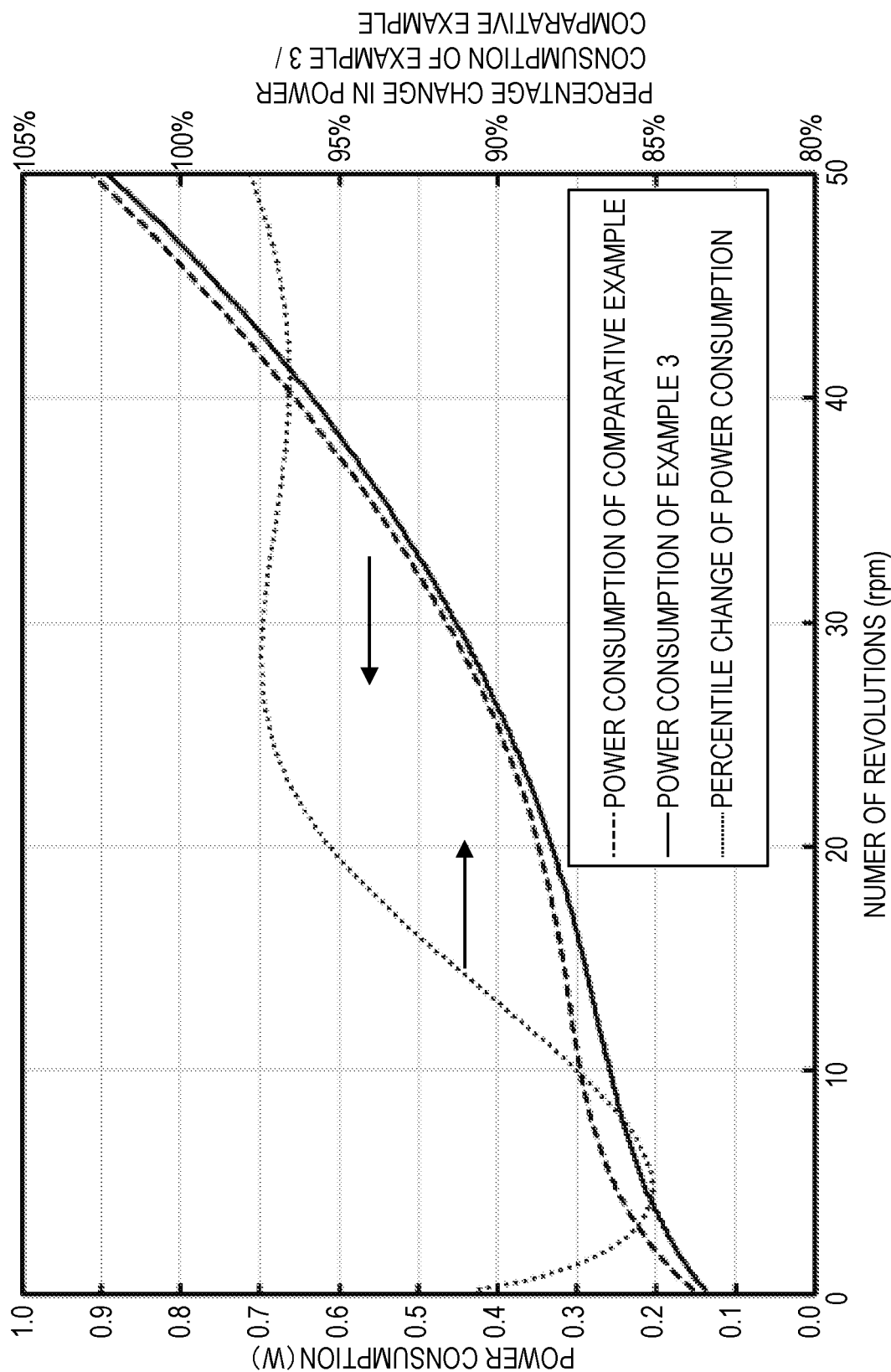
FIG. 12 is a graph illustrating driving test results of Example 3 and the comparative example.

Firstly, via screen printing using Ag paste, as illustrated in FIG. 9C, the common electrode 12 was formed on one surface of the piezoelectric ceramic 11 having an annular shape (illustrated in FIG. 9A), and as illustrated in FIG. 9B, 12 polarizable electrodes 61, three non-drive phase electrodes 13, and one vibration detecting electrode 14 were formed on another surface of the piezoelectric ceramic 11. The distance between adjacent electrodes illustrated in FIG. 9B was 0.5 mm.

Subsequently, the polarizing treatment using a DC power source was applied between the common electrode 12 and the polarizable electrodes 61, the non-drive phase electrodes 13, the vibration detecting electrode 14 in the air such that the piezoelectric element had polarities for expansion and contraction as illustrated in FIG. 5A. The magnitude of a voltage was set such that an electric field of 1.0 kV/mm was applied to the piezoelectric ceramic, and a temperature and a voltage application time were set to 100° C. and 60 minutes, respectively. The voltage was applied until the temperature decreased to 40° C.

plate used in the comparative example. The metal plate 3a was formed from a magnetic stainless steel SUS420 J2 per JIS standards. The steel SUS420 J2 is a martensitic stainless steel, and is an alloy containing 70% or greater by mass of steel and 12 to 14% by mass of chromium. The metal plate 3a having an annular shape was prepared to have an outer diameter 2R of 77.0 mm, an inner diameter of 67.1 mm, and a thickness of 5.0 mm.

TABLE 1

|  | Driving Region | | | | Non-driving region | | | | |
| --- | --- | --- | --- | --- | --- | --- | --- | --- | --- |
|  | Width of Groove portion (mm) | Width of Protruding Portion (mm) | Height of Protruding Portion (μm) | S2 | Width of Groove portion (mm) | Width of Protruding Portion (mm) | Height of Protruding Portion (μm) | S1 | S1/S2 |
| Comparative Example | 1.0 | 1.52 | ±0 | 0.60 | 1.0 | 1.52 | ±0 | 0.60 | 1.00 |
| Example 1 | 1.0 | 1.52 | ±0 | 0.60 | 1.15 | 1.52 | ±0 | 0.56 | 0.97 |
| Example 2 | 1.0 | 1.52 | ±0 | 0.60 | 1.0 | 1.00 | ±0 | 0.50 | 0.83 |
| Example 3 | 1.0 | 1.52 | ±0 | 0.60 | 1.0 | 1.52 | −100 | 0.55 | 0.92 |

Figure 9D:
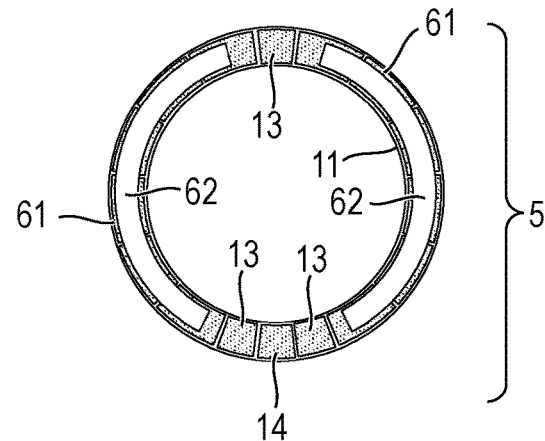

Subsequently, as illustrated in FIG. 9D, the piezoelectric element 5 was obtained by forming the connection electrode 62 for connecting together the polarizable electrodes 61 using Ag paste, and combining together both types of the electrodes into two drive phase electrodes 6. The Ag paste was dried at a temperature sufficiently lower than the depolarization temperature of the piezoelectric ceramic 11. A resistance value of each of the drive phase electrodes 6 was measured by a circuit tester (electric tester). One side of the tester was brought into contact with a surface of the polarizable electrode 61 closest to the vibration detecting electrode 14, and another side of the tester was brought into contact with a surface of the polarizable electrode 61 that is spaced furthest away from the vibration detecting electrode 14 in the circumferential direction of the drive phase electrode 6 having an annular shape. As a result, the resistance value of each of the drive phase electrodes 6 was 0.6Ω.

Figure 9E:
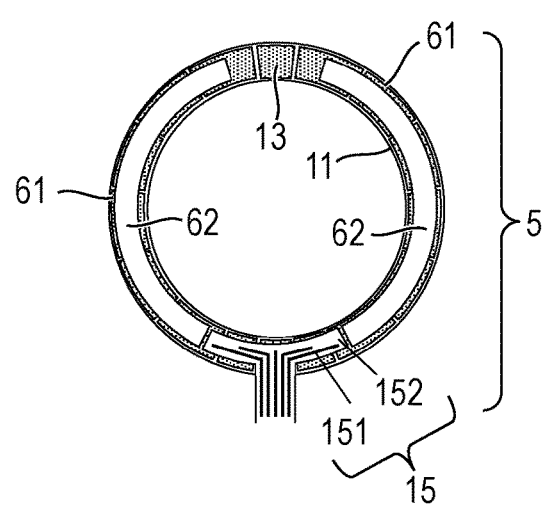

Subsequently, as illustrated in FIG. 9E, a flexible printed substrate 15 was press bonded to a region over two drive phase electrodes 6, two non-drive phase electrodes 13, and the vibration detecting electrode 14 of the piezoelectric element 5 in a room temperature process using a moisture curable epoxy resin adhesive. The flexible printed substrate 15 is a member provided to supply power to a group of the electrodes and to read a detection signal. The flexible printed substrate 15 has an electric wiring 151, a base film 152 having insulating properties, and a connector portion (not illustrated) for connecting the electrodes to the driving circuit outside.

(Example of Manufacturing Vibrating Plate in Related Art)

Table 1 illustrates the width of each groove portion, and the width and the height of each protruding portion in each of vibrating plates used in Examples 1 to 3 as the oscillator of the vibration wave motor of the present invention, and in a vibrating plate in the related art used in the following comparative example as the oscillator of the vibration wave motor in the related art.

Figure 10A:
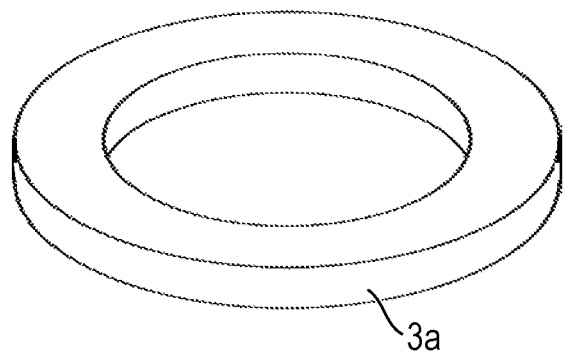
FIGS. 10A, 10B and 10C are schematic process views illustrating one example of a method of manufacturing a vibrating plate having an annular shape in the related art, which is used in a comparative example as an oscillator of a vibration wave motor in the related art.
Figure 10B:
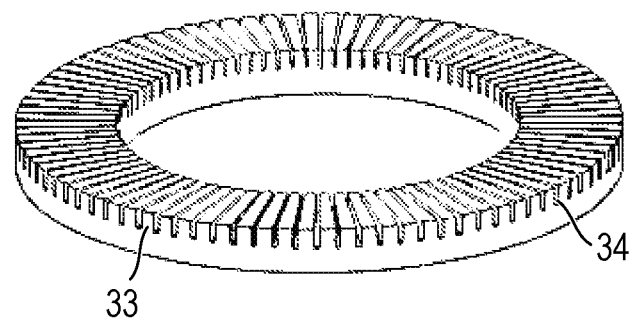

FIGS. 10A and 10B are schematic process views illustrating one example of a method of manufacturing the vibrating plate having an annular shape in the related art, which is used in the comparative example as the oscillator of the vibration wave motor in the related art.

Figure 10C:
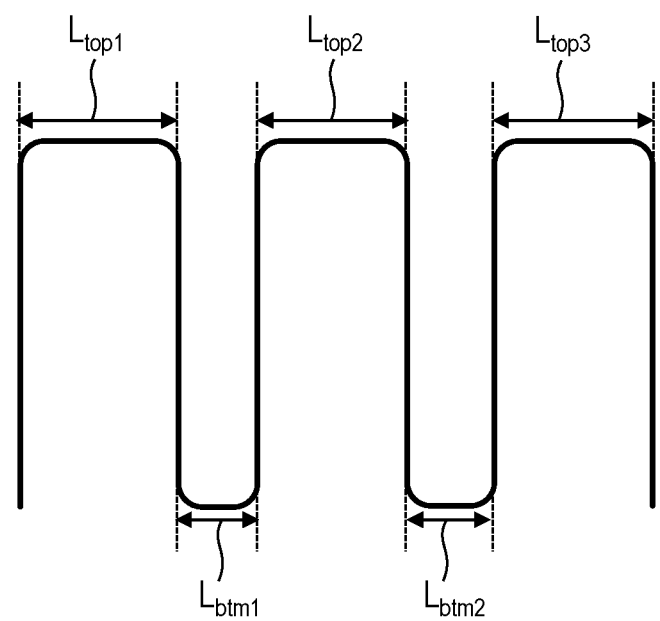

As illustrated in FIG. 10A, a metal plate 3a having an annular shape was prepared to manufacture the vibrating Subsequently, as illustrated in FIG. 10B, 90 locations of the metal plate 3a having an annular shape were cut radially from the center of the metal plate 3a using a machine while being equally spaced away from each other, thereby forming the groove portions 34 having a rectangular shape with a width of 1.0 mm and a depth of 1.85 mm on one surface (second surface 32) of the metal plate 3a having an annular shape (grooving). Each wall surface of each groove portion 34 was vertical to the first surface 31 of the metal plate 3a, which was not grooved. As illustrated in FIG. 10C, a groove bottom portion of each groove portion 34 had a slant shape in which the center of the groove bottom portion was the deepest. The vibrating plate 3 used in the oscillator 1 of the comparative example was obtained by performing a barrel process, lap polishing, and electroless nickel plating on the metal plate 3a that was grooved.

Because each groove portion 34 of the vibrating plate 3 had a rectangular shape with a width of 1.0 mm as the second surface 32 was seen, each protruding portion 33 had a fan shape having a wide width on an outer diameter side of the annulus.

Example 1 of Manufacturing Vibrating Plate of Present Invention: Groove Portion with Large Width The metal plate 3a was prepared by the same method as in the comparative example to manufacture the vibrating plate used in Example 1.

Subsequently, as illustrated in Table 1, groove portions were formed on one surface (second surface 32) of the metal plate 3a having an annular shape such that only the width of each groove portion 34 in the non-driving region 8 was changed as compared to the comparative example. Similarly, as illustrated in FIG. 10C, a groove bottom portion of each groove portion 34 had a slant shape in which the center of the groove bottom portion was the deepest. The width of each groove portion in a boundary portion between the non-driving region 8 and the driving region 7 was adjusted such that adjacent protruding portions 33 did not interfere with each other when the vibration wave motor was driven. The vibrating plate 3 used in the oscillator 1 of Example 1 was obtained by performing a barrel process, lap polishing, and electroless nickel plating on the metal plate 3a that was grooved.

Example 2 of Manufacturing Vibrating Plate of Present Invention: Protruding Portion with Small Width The metal plate 3a was prepared by the same method as in the comparative example to manufacture the vibrating plate used in Example 2.

Subsequently, as illustrated in Table 1, the groove portions 34 were formed on one surface (second surface 32) of the metal plate 3a having an annular shape such that only the width of each protruding portion 33 in the non-driving region 8 was changed as compared to the comparative example. Similarly, as illustrated in FIG. 10C, a groove bottom portion of each groove portion had a slant shape in which the center of the groove bottom portion was the deepest. The width of each groove portion 34 in a boundary portion between the non-driving region 8 and the driving region 7 was adjusted such that adjacent protruding portions 33 did not interfere with each other when the vibration wave motor was driven. The vibrating plate 3 used in the oscillator 1 of Example 2 was obtained by performing a barrel process, lap polishing, and electroless nickel plating on the metal plate 3a that was grooved.

Example 3 of Manufacturing Vibrating Plate of Present Invention: Protruding Portion with Low Height The metal plate 3a was prepared by the same method as in the comparative example to manufacture the vibrating plate used in Example 3.

Subsequently, as described above with reference to FIGS. 2A to 2E, as illustrated in Table 1, the groove portions 34 were formed on one surface (second surface 32) of the metal plate 3a having an annular shape such that only the height of one of the protruding portions 33 in contact with an end of the non-driving region 8 (including two non-drive phase electrodes 13 and one vibration detecting electrode 14 interposed between two non-drive phase electrodes 13) was changed as compared to the comparative example. Similarly, as illustrated in FIG. 10C, a groove bottom portion of each groove portion had a slant shape in which the center of the groove bottom portion was the deepest. The vibrating plate 3 used in the oscillator 1 of Example 3 was obtained by performing a barrel process, lap polishing, and electroless nickel plating on the metal plate 3a that was grooved.

(Example of Manufacturing Oscillator)

An oscillator was manufactured by combining together the piezoelectric element illustrated in the manufacturing example, and the vibrating plate illustrated in the examples of manufacturing the vibrating plate of the present invention and the vibrating plate in the related art.

Subsequently, as illustrated in FIG. 1A, the oscillator 1 was manufactured by press bonding the piezoelectric element 5 to the first surface 31 of the vibrating plate 3 in a room temperature process using a moisture curable epoxy resin adhesive, and connecting together the vibrating plate 3 and 3 non-drive phase electrodes 13 (illustrated in FIG. 1B) via a short circuit wiring (not illustrated) formed from Ag paste. The Ag paste was dried at a temperature sufficiently lower than the depolarization temperature of the piezoelectric ceramic 11.

(Example of Manufacturing Vibration Damping Member)

A felt (product name: GS felt and manufactured by Toray Industries Inc.) having an annular shape was prepared to manufacture the vibration damping member used in the vibration wave motors of the present invention and in the related art.

The vibration damping member had an outer diameter of 71.2 mm, an inner diameter of 67.2 mm, and a thickness of 1.0 mm.

As illustrated in FIGS. 2A to 2E, a vibration damping member 4 as manufactured was bonded to the surface (on which the piezoelectric element 5 was provided) of the oscillator 1 using a moisture curable epoxy resin adhesive.

(Example of Manufacturing Pressing Member)

Two SUS plates having an annular shape and a wave washer interposed between two SUS plates were prepared to manufacture the pressing member used in the vibration wave motor of the present invention. Each SUS plate having an annular shape had an outer diameter of 71.2 mm, an inner diameter of 67.2 mm, and a thickness of 1 mm. A plate spring having an annular shape was prepared which had an outer diameter of 71.2 mm, an inner diameter of 67.2 mm, and a harness where the plate spring is deflected by 0.5 mm when a force of 10N is applied thereto.

Figure 11:
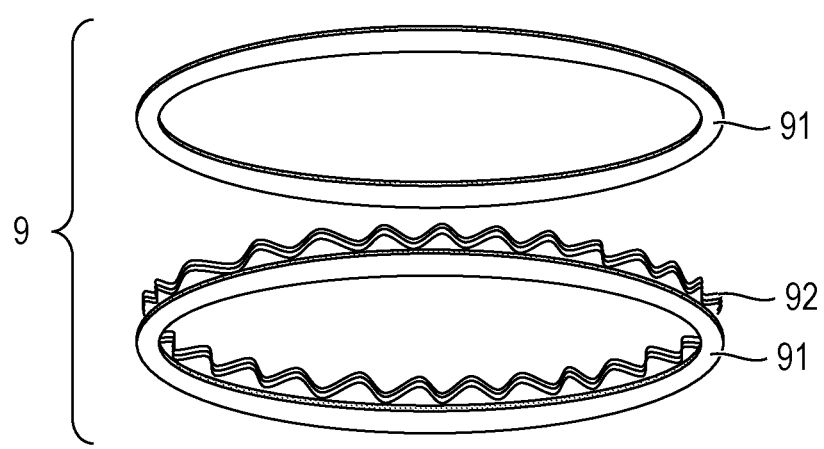
FIG. 11 is a schematic process view illustrating one example of a method of manufacturing a pressing member.

Subsequently, as illustrated in FIG. 11, the pressing member 9 was obtained by sequentially stacking a SUS plate 91 subjected to pressing, a plate spring 92 having an annular shape, and a SUS plate 91 having an annular shape on top of each other.

As illustrated in FIGS. 2A to 2E, the pressing member 9 as manufactured was bonded to one surface of the vibration damping member 4 using a moisture curable epoxy resin adhesive.

(Example of Manufacturing Moving Member)

A moving member having an annular shape with an outer diameter of 77.0 mm, an inner diameter of 67.1 mm, and a thickness of 5 mm was manufactured for use in the vibration wave motor of the present invention and a vibration wave motor for comparison.

An aluminum metal was used as the material of the moving member. The moving member was shaped by blocking cutting, and the alumite treatment was applied to the surface of the moving member.

(Example and Comparative Example of Manufacturing Vibration Wave Motor)

As illustrated in FIG. 1A and FIGS. 2A to 2E, the vibration wave motors of Examples 1 to 3 of the present invention were manufactured by sequentially stacking the moving member 2, the oscillator 1, the vibration damping member 4, and the pressing member 9 on top of each other, and bringing the moving member 2 into press contact with the second surface 32 of the oscillator 1 via the pressing member 9. Similarly, the vibration wave motor of the comparative example was manufactured. In all of the vibration wave motors, a pressure force was set to 1.5 kgf.

(Example and Comparative Example of Manufacturing Drive Control System)

Subsequently, as illustrated in FIG. 9E, the drive control system of the present invention having the configuration illustrated in FIG. 6 was manufactured such that the drive phase electrodes 6, the non-drive phase electrodes 13 shorted to the common electrode 12, and the vibration detecting electrode 14 in the vibration wave motor of the present invention were electrically connected to the driving circuit outside via the connector portion of the flexible printed substrate 15. The driving circuit outside had a control mechanism for driving the vibration wave motor, and the signal generation unit that output alternating voltages for generating a 7th bending vibrating wave in response to an instruction from the control mechanism.

Similarly, a drive control system for comparison was manufactured, and driving tests of the drive control system of the present invention and the drive control system for comparison were performed.

An alternating voltage having an amplitude of 70 V was applied to the drive phase electrodes 6 (A phase and B phase) (refer to FIG. 3). In both of the drive control systems, alternating voltages having a temporal phase difference of π/2 were applied to the drive phase electrodes 6 (A phase and B phase) while the frequency was being swept from 29 to 26 kHz for 90 seconds.

FIG. 12 illustrates driving test results of Example 3 and the comparative example. The horizontal axis represents the number of revolutions of the vibration wave motor, the left vertical axis represents power consumption, and the right vertical axis represents a percentage change in power consumption of Example 3 relative to power consumption of the comparative example. In a range up to the number of revolutions of 50 rpm, a power consumption of Example 3 is less than a power consumption of the comparative example at the same number of revolutions. In the structure of Example 3, a traveling wave traveling reverse to a desired circumferential direction is prevented from being generated, and the reverse traveling wave is less transmitted to the moving member 2. As a result, it can be seen that a driving efficiency improves.

Table 2 illustrates how much power consumptions of Examples 1 to 3 are reduced at the number of revolutions of 10 rpm relative to the comparative example. The power consumptions of all the examples are less than the power consumption of the comparative example. In the structures of Examples 1 to 3, a traveling wave traveling reverse to the desired circumferential direction is prevented from being generated, and the reverse traveling wave is less transmitted to the moving member 2. As a result, it can be seen that a driving efficiency improves.

TABLE 2

|  | S1/S2 | Power Consumption at Number of Revolutions of 10 rpm Relative to Comparative Example (%) |
| --- | --- | --- |
| Example 1 | 0.97 | 95.3 |
| Example 2 | 0.83 | 73.4 |
| Example 3 | 0.92 | 87.5 |

(Example of Manufacturing Optical Apparatus)

The optical apparatus illustrated in FIGS. 7A and 7B and FIG. 8 was manufactured, and it was confirmed that the optical apparatus performed an auto-focus operation in response to the application of alternating voltages applied by the drive control system used in the vibration wave motor of the present invention.

The present invention provides a vibration wave motor realizing an improved driving efficiency and a reduced power consumption compared to a vibration wave motor in the related art, and a drive control system and an optical apparatus in which the vibration wave motor is used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-110576, filed Jun. 8, 2018, which is hereby incorporated by reference herein in its entirety.

What is claimed is:

1. A vibration wave motor comprising:
an oscillator having an annular shape; and
a moving member having an annular shape,
wherein the oscillator has a vibrating plate having an annular shape which is in contact with the moving member, and a piezoelectric element,
wherein the piezoelectric element has a plurality of drive phase electrodes, and
wherein when a driving region represents a region of the oscillator in which the drive phase electrodes are provided, and a non-driving region represents a remaining region of the oscillator, a contact area ratio S1 between the vibrating plate and the moving member in the non-driving region is less than a contact area ratio S2 between the vibrating plate and the moving member in the driving region.

2. The vibration wave motor according to claim 1, wherein the value of S1/S2, which is the ratio of S1 to S2, is less than or equal to 0.97.

3. A drive control system comprising at least:
the vibration wave motor according to claim 1; and
a driving circuit electrically connected to the vibration wave motor.

4. The drive control system according to claim 3, wherein the driving circuit has a signal generation unit that generates a 7th bending vibrating wave in the oscillator.

5. An optical apparatus comprising at least:
the drive control system according to claim 3; and
an optical member dynamically connected to the vibration wave motor.

6. An apparatus comprising:
the vibration wave motor according to claim 1; and
a driven member capable of being driven by the vibration wave motor.

7. A vibration wave motor comprising:
an oscillator having an annular shape; and
a moving member having an annular shape,
wherein the oscillator has a vibrating plate having an annular shape which is in contact with the moving member, and a piezoelectric element,
wherein the piezoelectric element has a plurality of drive phase electrodes, and
wherein when a driving region represents a region of the oscillator in which the drive phase electrodes are provided, and a non-driving region represents a remaining region of the oscillator, a frictional force A of a portion of the vibrating plate in contact with the moving member in the non-driving region is less than a frictional force B of a portion of the vibrating plate in contact with the moving member in the driving region.

8. A vibration wave motor comprising:
an oscillator having an annular shape; and
a moving member having an annular shape,
wherein the oscillator has a vibrating plate having an annular shape which is in contact with the moving member, and a piezoelectric element,
wherein the piezoelectric element has a plurality of drive phase electrodes, and
wherein when a driving region represents a region of the oscillator in which the drive phase electrodes are provided, and a non-driving region represents a remaining region of the oscillator, a frictional coefficient α of a portion of the vibrating plate in contact with the moving member in the non-driving region is less than a frictional coefficient $\beta$ of a portion of the vibrating plate in contact with the moving member in the driving region.

* * * * *